(12) United States Patent
Lemke et al.

(10) Patent No.: US 7,156,056 B2
(45) Date of Patent: Jan. 2, 2007

(54) TWO-CYCLE, OPPOSED-PISTON INTERNAL COMBUSTION ENGINE

(75) Inventors: James U. Lemke, San Diego, CA (US); William B. McHargue, San Diego, CA (US)

(73) Assignee: Achates Power, LLC, San Diego, CA (US)

( * ) Notice: Subject to any disclaimer, the term of this patent is extended or adjusted under 35 U.S.C. 154(b) by 0 days.

(21) Appl. No.: 10/865,707

(22) Filed: Jun. 10, 2004

(65) Prior Publication Data

US 2005/0274332 A1 Dec. 15, 2005

(51) Int. Cl.
*F01P 3/08* (2006.01)
*F01P 3/06* (2006.01)

(52) U.S. Cl. ............................... 123/41.35; 123/41.34

(58) Field of Classification Search ........... 123/51 BA, 123/67, 41.35, 41.34, 51 AA, 197.4
See application file for complete search history.

(56) References Cited

U.S. PATENT DOCUMENTS

| | | | | |
|---|---|---|---|---|
| 704,713 | A * | 7/1902 | Klein ....................... | 123/41.35 |
| 1,603,173 | A | 10/1926 | Watts | |
| 1,972,409 | A | 9/1934 | Petersen ....................... | 123/51 |
| 2,056,056 | A * | 9/1936 | Stearns .................. | 123/51 BA |
| 2,076,334 | A * | 4/1937 | Burns ....................... | 123/51 B |
| 2,169,807 | A * | 8/1939 | Lyon ........................... | 417/488 |
| 2,244,323 | A | 6/1941 | Antonsen et al. ........... | 123/173 |
| 2,374,460 | A * | 4/1945 | Rossman ............... | 123/51 BB |
| 2,398,980 | A | 4/1946 | Vonruti ........................ | 123/51 |
| 2,417,910 | A | 3/1947 | Bruegger ....................... | 74/44 |
| 2,423,395 | A | 7/1947 | Lieberherr .................. | 123/173 |
| 2,435,361 | A | 2/1948 | Mallory ....................... | 123/51 |
| 2,463,308 | A | 3/1949 | Prieto ......................... | 123/51 |
| 2,486,185 | A | 10/1949 | Mallory ....................... | 123/51 |
| 2,776,649 | A | 1/1957 | Fenske ........................ | 123/58 |
| 3,023,743 | A | 3/1962 | Schauer ....................... | 123/51 |
| 3,117,566 | A * | 1/1964 | Venediger ............... | 123/51 BA |
| 3,209,736 | A * | 10/1965 | Witzky ..................... | 123/48 R |
| 3,384,057 | A | 5/1968 | Boone ......................... | 123/51 |
| 3,528,394 | A * | 9/1970 | Cummins .................. | 123/51 A |
| 3,534,715 | A | 10/1970 | Antonsen et al. ......... | 123/41.79 |
| 3,868,931 | A * | 3/1975 | Dutry et al. .............. | 123/51 R |
| 4,010,611 | A * | 3/1977 | Zachery ...................... | 60/516 |
| 4,030,471 | A | 6/1977 | Ginkel ....................... | 123/197 |
| 4,090,479 | A * | 5/1978 | Kaye ........................ | 123/306 |
| 4,375,792 | A * | 3/1983 | Barret .................... | 123/51 AA |
| 4,565,165 | A | 1/1986 | Papanicolaou ............... | 123/51 |
| 4,794,896 | A | 1/1989 | Tsai et al. .................... | 123/193 |
| 5,042,441 | A | 8/1991 | Paul et al. .................. | 123/276 |
| 5,058,537 | A | 10/1991 | Paul et al. .................... | 123/51 |
| 5,213,067 | A | 5/1993 | Kramer ........................ | 123/51 |

(Continued)

FOREIGN PATENT DOCUMENTS

CH 20385 10/1899

(Continued)

OTHER PUBLICATIONS

Joey K. Parker, Stuart R. Bell, David M. Davis; *An opposed Piston Diesel Engine*, ICE vol. 18, New Developments in Off-Highway Engines, ASME 1992, pp. 17-24.

(Continued)

*Primary Examiner*—Mahmoud Gimie
(74) *Attorney, Agent, or Firm*—Incaplaw; Terrance A. Meador

(57) ABSTRACT

In a two-cycle, opposed-piston internal combustion engine with optimized cooling and no engine block, the opposed pistons are coupled to a pair of crankshafts by connecting rods that are subject to substantially tensile forces acting between the pistons and the crankshafts.

53 Claims, 22 Drawing Sheets

U.S. PATENT DOCUMENTS

| | | | |
|---|---|---|---|
| 5,375,573 A | 12/1994 | Bowman | 123/196 |
| 5,806,631 A | 9/1998 | Yoshida et al. | 184/18 |
| 5,826,556 A | 10/1998 | Ruman et al. | 123/196 |
| 5,915,345 A * | 6/1999 | Kling et al. | 123/41.35 |
| 6,039,011 A * | 3/2000 | Agalarov et al. | 123/51 AA |
| 6,182,619 B1 | 2/2001 | Spitzer et al. | 123/51 |
| 6,257,180 B1 | 7/2001 | Klein | 123/70 |
| 6,283,478 B1 | 9/2001 | Kumai et al. | 277/435 |
| 6,305,334 B1 | 10/2001 | Schuko | 123/56.2 |
| 6,418,885 B1 * | 7/2002 | Paul et al. | 123/25 C |
| 6,481,389 B1 | 11/2002 | Suzuki et al. | 123/41.35 |
| 6,662,762 B1 | 12/2003 | Schuko | 123/56.1 |
| 2004/0011308 A1 | 1/2004 | Hausler et al. | 123/73 |

FOREIGN PATENT DOCUMENTS

| | | |
|---|---|---|
| DE | 11054 | 0/1884 |
| DE | 4243571 A1 | 12/1992 |
| DE | 199 62 325 A | 7/2001 |
| EP | 0609866 A1 | 2/1994 |
| EP | 0943788 A1 | 2/1999 |
| GB | 3720 | 3/1900 |
| GB | 558 115 A | 12/1943 |
| GB | 558115 | 12/1943 |
| GB | 779 631 A | 7/1957 |
| WO | WO 00/28194 | 5/2000 |
| WO | WO 00/68553 | 11/2000 |

OTHER PUBLICATIONS

J. Craig McLanahan, Salem State College; *Diesel Aircraft Engine: A Delayed Promise from the 1930's,* SAE International and American Institute of Aeronautics, 1999-01-5583, pp. 1-10.

J.F. Butler, E.P. Crowdyt; *The Doxford Seaforce Engine*, paper presented at join meeting of the Institute and N.E.C.I.E.S. on Nov. 8-9, pp. 73-115.

\* cited by examiner

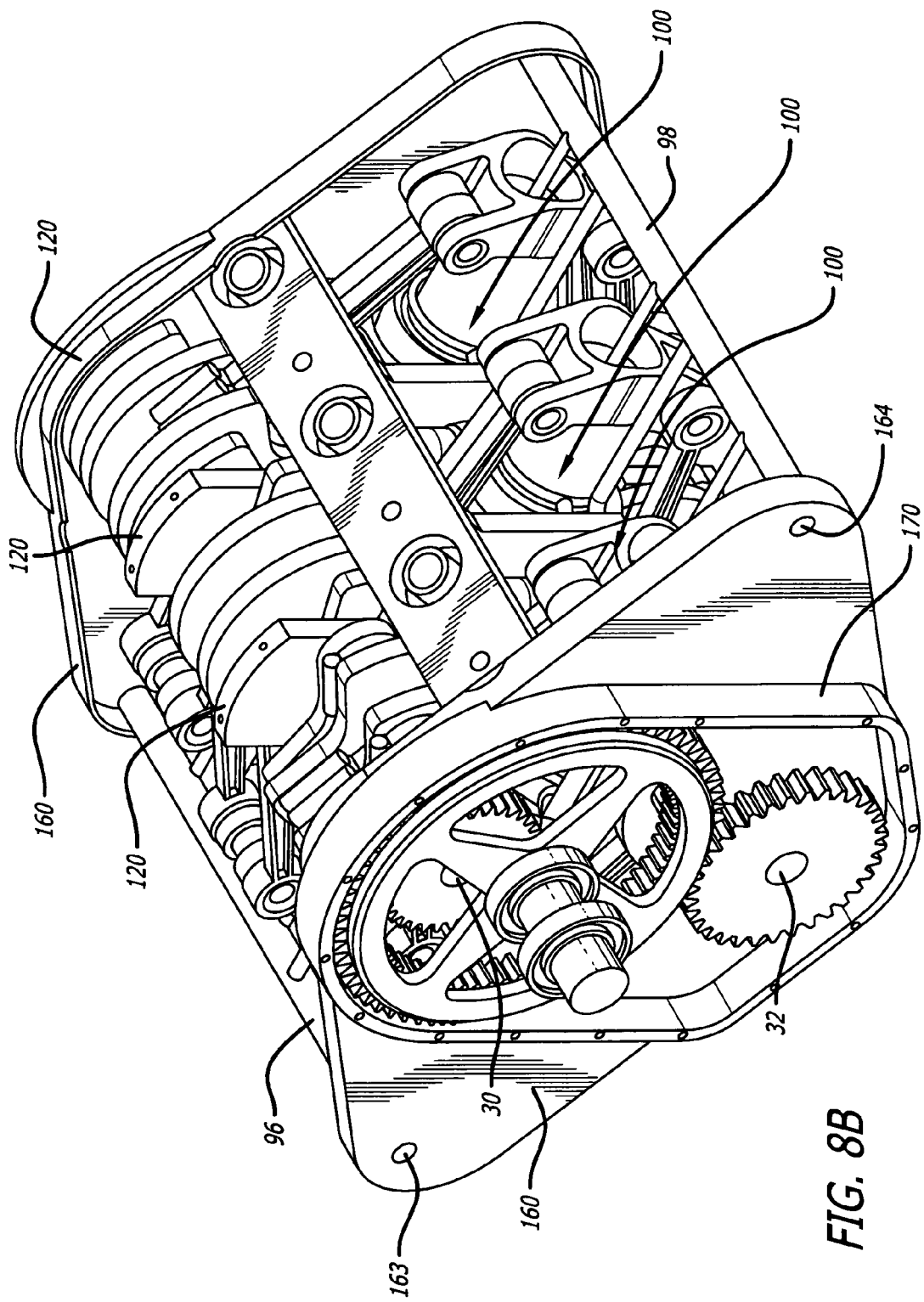

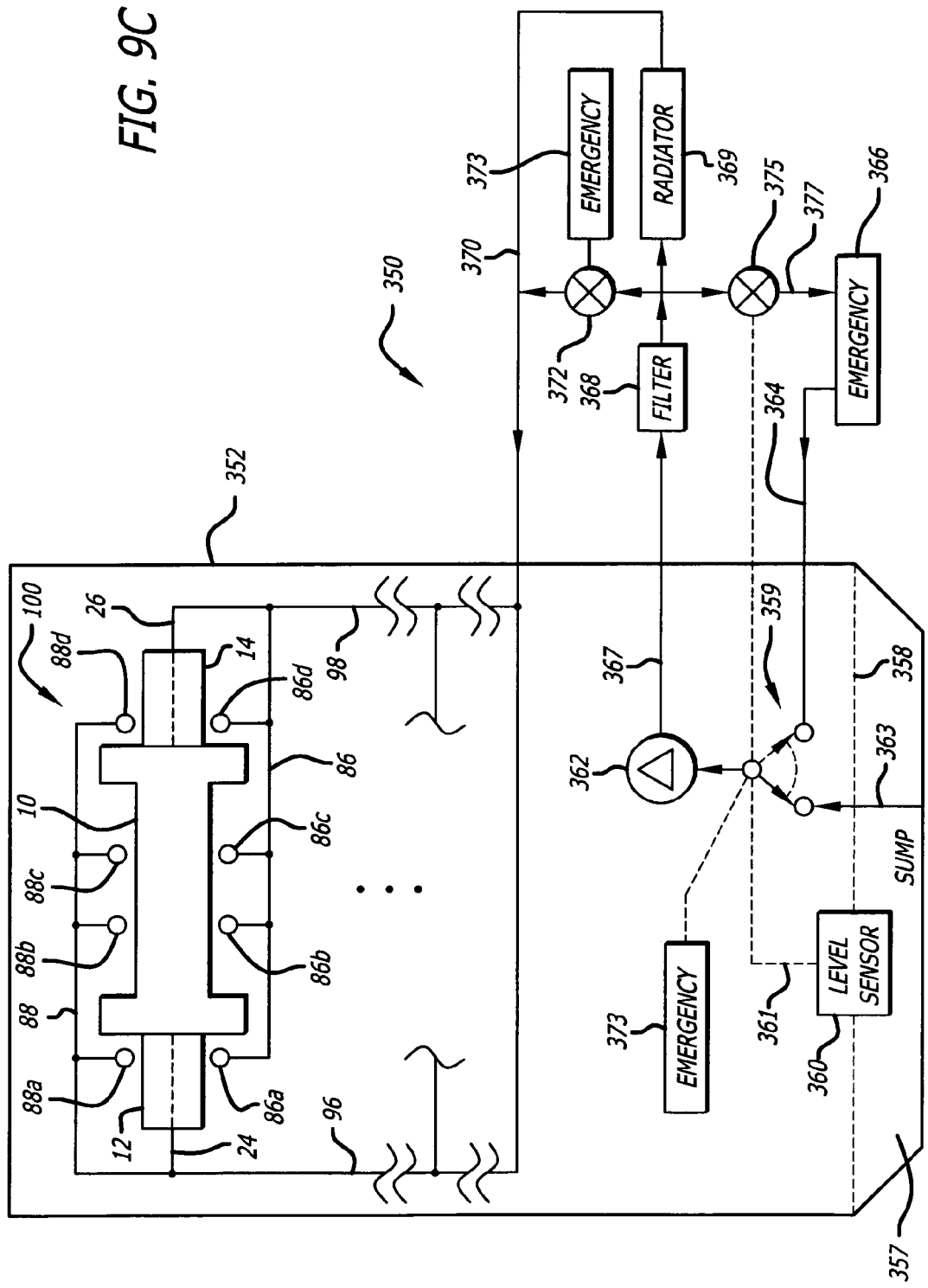

TWO-CYCLE, OPPOSED-PISTON INTERNAL COMBUSTION ENGINE

RELATED APPLICATIONS

The following copending applications, all commonly assigned to the assignee of this application, contain subject matter related to the subject matter of this application:

PCT application US05/020553, filed Jun. 10, 2005 for "Improved Two Cycle, Opposed Piston Internal Combustion Engine", published as WO2005/124124A1 on Dec. 29, 2005;

U.S. patent application Ser. No. 11/095,250, filed Mar. 31, 2005 for "Opposed Piston, Homogeneous Charge, Pilot Ignition Engine";

PCT application US06/011886, filed Mar. 30, 2006 for "Opposed Piston, Homogeneous Charge, Pilot Ignition Engine";

U.S. patent application Ser. No. 11/097,909, filed Apr. 1, 2005 for "Common Rail Fuel Injection System With Accumulator Injectors";

PCT application US06/012353, filed Mar. 30, 2006 "Common Rail Fuel Injection System With Accumulator Injectors"; and U.S. patent application Ser. No. 11/378,959, filed Mar. 17, 2006 for "Opposed Piston Engine".

BACKGROUND

The invention concerns an internal combustion engine. More particularly, the invention relates to a two-cycle, opposed-piston engine.

The opposed piston engine was invented by Hugo Junkers around the end of the nineteenth century. Junkers' basic configuration, shown in FIG. 1, uses two pistons P1 and P2 disposed crown-to-crown in a common cylinder C having inlet and exhaust ports I and E near bottom-dead-center of each piston, with the pistons serving as the valves for the ports. Bridges B support transit of the piston rings past the ports I and E. The engine has two crankshafts C1 and C2, one disposed at each end of the cylinder. The crankshafts, which rotate in the same direction, are linked by rods R1 and R2 to respective pistons. Wristpins W1 and W2 link the rods to the pistons. The crankshafts are geared together to control phasing of the ports and to provide engine output. Typically, a turbo-supercharger is driven from the exhaust port, and its associated compressor is used to scavenge the cylinders and leave a fresh charge of air each revolution of the engine. The advantages of Junkers' opposed piston engine over traditional two-cycle and four-cycle engines include superior scavenging, reduced parts count and increased reliability, high thermal efficiency, and high power density. In 1936, the Junkers Jumo airplane engines, the most successful diesel engines to that date, were able to achieve a power density and fuel efficiency that have not been matched by any diesel engine since. According to C. F. Taylor (*The Internal-Combustion Engine in Theory and Practice: Volume II, revised edition*; MIT Press, Cambridge, Mass., 1985): "The now obsolete Junkers aircraft Diesel engine still holds the record for specific output of Diesel engines in actual service (Volume I, FIG. 13-11)."

Nevertheless, Junkers' basic design contains a number of deficiencies. The engine is tall, with its height spanning the lengths of four pistons and at least the diameters of two crankshafts, one at each end of the cylinders. A long gear train with typically five gears is required to couple the outputs of the two crankshafts to an output drive. Each piston is connected to a crankshaft by a rod that extends from the interior of the piston. As a consequence the rods are massive to accommodate the high compressive forces between the pistons and crankshafts. These compressive forces, coupled with oscillatory motion of the wrist pins and piston heating, cause early failure of the wrist pins connecting the rods to the pistons. The compressive force exerted on each piston by its connecting rod at an angle to the axis of the piston produces a radially-directed force (a side force) between the piston and cylinder bore. This side force increases piston/cylinder friction, raising the piston temperature and thereby limiting the brake mean effective pressure (BMEP) achievable by the engine. One crankshaft is connected only to exhaust side pistons, and the other only to inlet side pistons. In the Jumo engine the exhaust side pistons account for up to 70% of the torque, and the exhaust side crankshaft bears the heavier torque burden. The combination of the torque imbalance, the wide separation of the crankshafts, and the length of the gear train coupling the crankshafts produces torsional resonance effects (vibration) in the gear train. A massive engine block is required to constrain the highly repulsive forces exerted by the pistons on the crankshafts during combustion, which literally try to blow the engine apart.

One proposed improvement to the basic opposed-piston engine, described in Bird's U.K. Patent 558,115, is to locate the crankshafts beside the cylinders such that their axes of rotation lie in a plane that intersects the cylinders and is normal to the axes of the cylinder bores. Such side-mounted crankshafts are closer together than in the Jumo engines, and are coupled by a shorter gear train. The pistons and crankshafts are connected by rods that extend from each piston along the sides of the cylinders, at acute angles to the sides of the cylinders, to each of the crankshafts. In this arrangement, the rods are mainly under tensile force, which removes the repulsive forces on the crankshafts and yields a substantial weight reduction because a less massive rod structure is required for a rod loaded with a mainly tensile force than for a rod under a mainly compressive load of the same magnitude. The wrist pins connecting the rods to the pistons are disposed outside of the pistons on saddles mounted to the outer skirts of the pistons. Bird's proposed engine has torsional balance brought by connecting each piston to both crankshafts. This balance, the proximity of the crankshafts, and the reduced length of the gear train produce good torsional stability. To balance dynamic engine forces, each piston is connected by one set of rods to one crankshaft and by another set of rods to the other crankshaft. This load balancing essentially eliminates the side forces that otherwise would operate between the pistons and the internal bores of the cylinders. The profile of the engine is also reduced by repositioning the crankshafts to the sides of the cylinders, and the shorter gear train requires fewer gears (four) than the Jumo engine. However, even with these improvements, a number of problems prevent Bird's proposed engine from reaching its full potential for simplification and power-to-weight ratio ("PWR", which is measured in horsepower per pound, hP/lb).

The favorable PWR of opposed piston engines as compared with other two and four cycle engines results mainly from the simple designs of these engines which eliminate cylinder heads, valve trains, and other parts. However, reducing weight alone has only a limited ability to boost PWR because at any given weight, any increase in BMEP to increase power is confined by the limited capability of the engines to cool the pistons.

Substancial combustion chamber heat is absorbed by pistons and cylinders. In fact the crown of a piston is one of the hottest spots in a two-cycle, opposed-piston compression-ignition engine. Excessive piston heat will cause piston seizure. The piston must be cooled to mitigate this threat. In all high performance engines, the pistons are cooled principally by rings mounted to the outside surfaces of the pistons, near their crowns. The rings of a piston contact the cylinder bore and conduct heat from the piston to the cylinder, and therethrough to a coolant flowing through a cooling jacket or by cooling fins on the engine cylinder assembly. Intimate contact is required between the rings and cylinder bore to cool the piston effectively. But piston rings must be lightly loaded in two-cycle, ported engines in order to survive transit over the bridges of the cylinder ports, where very complex stresses occur. Therefore, the rings are limited in their ability to cool the pistons, which places a limit on the maximum combustion chamber temperature achievable before engine failure occurs. It is clear that, without more effective piston cooling, BMEP cannot be increased in an opposed piston engine without endangering the engine's operation.

Prior engines include an engine block in which cylinders and engine bearings are cast in a large passive unit that serves as the primary structural and architectural element of the engine. Although Bird's engine rectified torque imbalance, eliminated compressive forces on the rods, and eliminated side forces on the cylinder bore, it still used the engine block as the primary structural element, providing support for the cylinders, manifolds for cylinder ports, and cooling jackets for the cylinders and for retaining the engine bearings. But thermal and mechanical stresses transmitted through the engine block cause non-uniform distortion of the cylinders and pistons necessitating piston rings to assist in maintaining the piston/cylinder seal.

SUMMARY

In one aspect, increased BMEP is realized in a two-cycle, opposed-piston engine with side-mounted crankshafts and optimized piston cooling. In this engine, pistons are substantially withdrawn from a cylinder during engine operation to be cooled externally of the cylinder by direct application of coolant onto outside surface portions of the pistons.

In another aspect, rather than forming an architectural or structural component of the engine, the cylinder acts primarily as a pressure vessel that contains the forces of combustion.

In yet another aspect, the cylinder and pistons are substantially radially symmetric and free of non-uniform radial thermal and mechanical stress along their axial lengths. Combined with improved piston cooling, this characteristic permits optional ringless operation. Without rings, inlet and exhaust port design can be simplified by elimination of bridges. The resulting large port areas and absence of flow-impeding structures permit high volumetric flow efficiency and support excellent scavenging, further improving power output.

These improvements, and other improvements and advantages described in the specification which follows, provide a very simple two-cycle, opposed-piston, engine capable of a substantial increase in BMEP, and with reduced weight, resulting in an engine capable of BMEP and PWR much higher than attained by comparable prior art engines of the same speed.

BRIEF DESCRIPTION OF THE DRAWINGS

The below-described drawings are meant to illustrate principles and examples discussed in the following detailed description. They are not necessarily to scale.

FIG. 2A shows the pistons at inner, or top dead center. FIG. 2B shows the pistons at outer, or bottom dead center.

FIGS. 8A–8C are perspective views of a multiple-cylinder opposed-piston engine module showing assembly details at increasingly complete stages of assembly.

FIG. 9C is a schematic diagram of another supply system for an opposed-piston engine which provides liquid coolant to the engine.

DETAILED DESCRIPTION

Figure 2A:
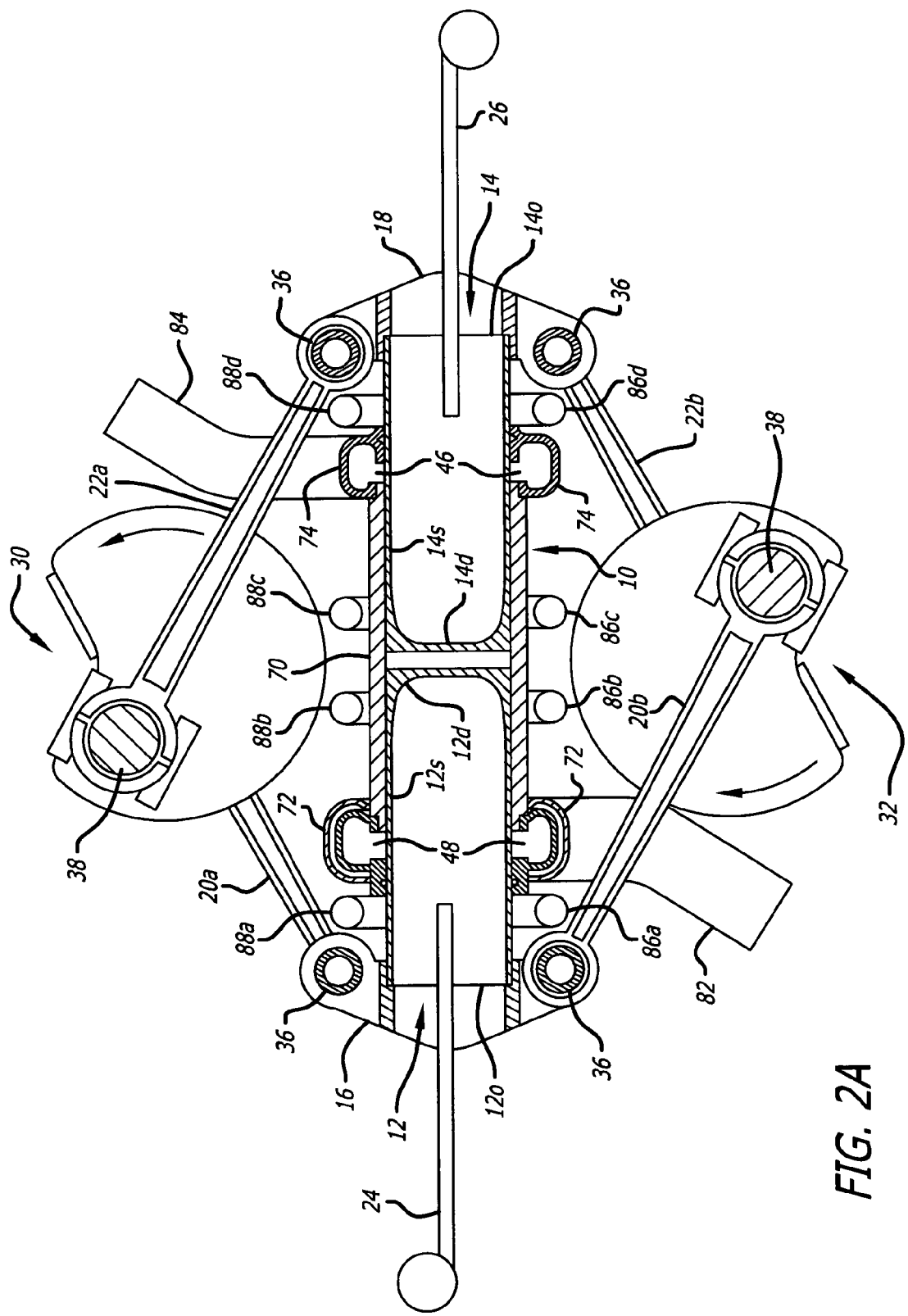
FIGS. 2A and 2B are side sectional views of a cylinder with opposed pistons coupled by tensile-loaded connecting rods to two crankshafts.
Figure 2B:
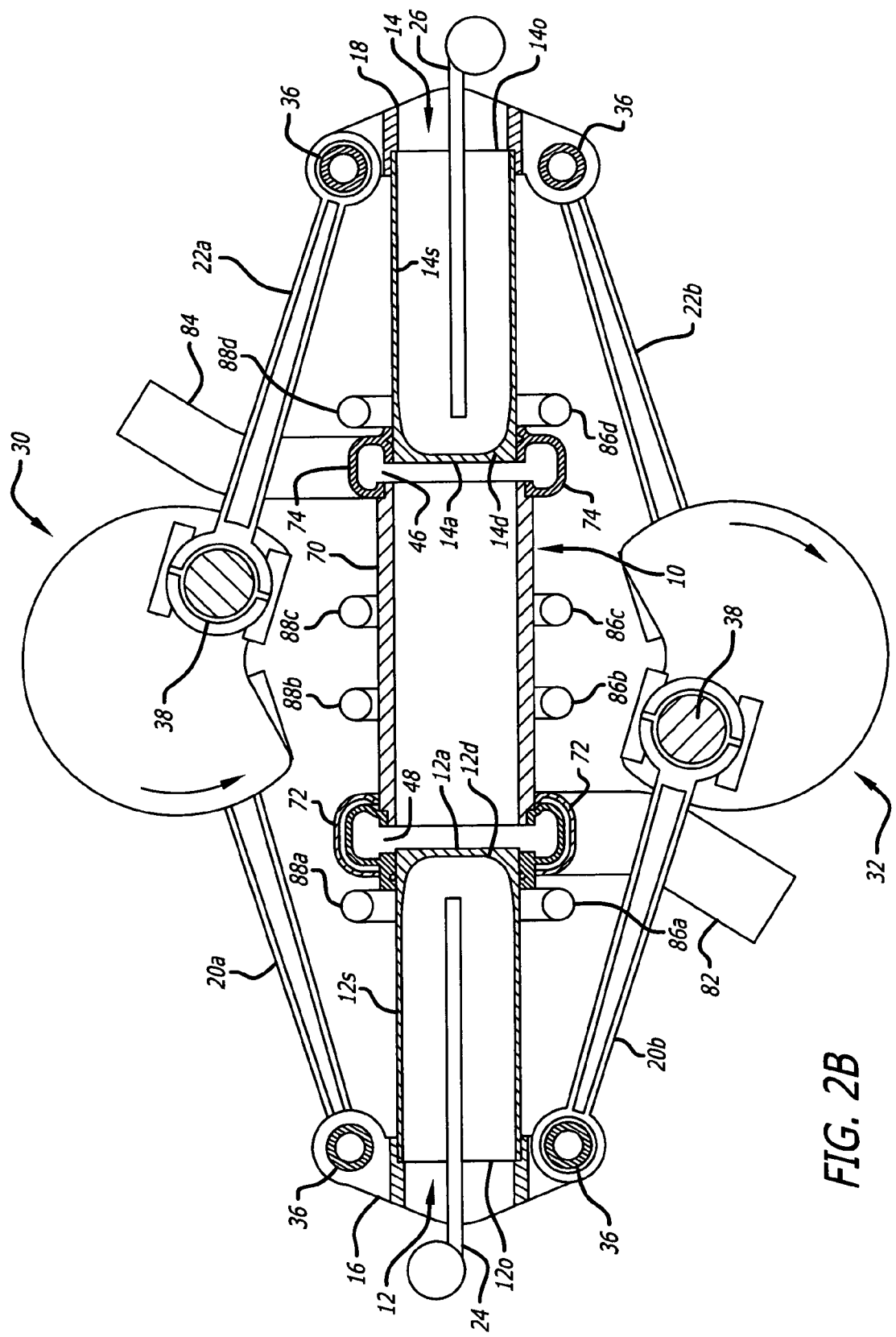

Components of our new opposed piston engine are illustrated in FIGS. 2A and 2B. These figures show a cylinder 10 with opposed pistons 12 and 14 disposed therein. The pistons 12 and 14 move coaxially in the cylinder 10 in opposed motions, toward and away from each other. FIG. 2A illustrates the pistons 12 and 14 at top (or inner) dead center where they are at the peak of their compression strokes, near the moment of ignition. FIG. 2B illustrates the pistons near bottom (or outer) dead center, where they are at the end of their expansion or power strokes. These and intermediate positions will be described in more detail below.

The following explanation presumes a compression-ignition engine for the sake of illustration and example only. Those skilled in the art will realize that the elements, modules and assemblies described may also be adapted for a spark-ignition engine.

As shown in FIGS. 2A and 2B, the cylinder 10 is a tube with the opposed pistons 12 and 14 disposed in it for reciprocating opposed motion toward and away from each other and the center of the cylinder 10. The pistons 12 and 14 are coupled to first and second side-mounted counter-rotating crankshafts 30 and 32 which, in turn, are coupled to a common output (not shown in these figures).

The pistons 12 and 14 are hollow cylindrical members with closed axial ends 12a and 14a which terminate in crowns 12d and 14d, open axial ends 12o and 14o, and skirts 12s and 14s which extend from the open axial ends 12o and 14o to the crowns 12d and 14d. Saddles 16 and 18, in the form of open annular structures, are mounted to the open axial ends 12o and 14o of the pistons 12 and 14, respectively. Each of the saddles 16, 18 connects ends of a plurality of connecting rods to the respective piston on which it is mounted. The perspective of these figures illustrates only two connecting rods for each piston, and it is to be understood that one or more additional connecting rods are not visible. The connecting rods 20a and 20b are connected to the saddle 16 near the open end of the piston 12, while the connecting rods 22a and 22b are connected to the saddle 18 near the open end of the piston 14. Because the saddles 16 and 18 provide linkage between the pistons 12 and 14 and their respective rods, the pistons lack internal wristpins. The resulting open structure of the saddles and the pistons permits coolant dispensers 24 and 26 to extend axially into the pistons 12 and 14 from the open ends 12o and 14o to be aimed at the crowns and internal skirts of the pistons 12 and 14, respectively.

The two side-mounted crankshafts 30 and 32 are disposed with their axes parallel to each other and lying in a common plane that intersects the cylinder 10 at or near its longitudinal center and that is perpendicular to the axis of the cylinder. The crankshafts rotate in opposite directions. The connecting rods 20a, 20b and 22a, 22b are connected to crank throws on the crankshafts 30 and 32. Each connecting rod is disposed to form an acute angle with respect to the axes (and the sides) of the cylinder 10 and the pistons 12 and 14. The connecting rods are linked to the saddles 16 and 18 by means of needle bearings 36, and to the crank throws by means of roller bearings 38. As each piston moves through the operational cycle of the engine, the ends of the connecting rods coupled to the piston's saddle oscillate through an angular path, and there is no complete revolution between those ends and the elements of the saddle to which they are coupled. Needle bearings with sufficiently small diameter rollers produce at least full rotation of the rollers during each oscillation, thereby reducing wear asymmetry and extending bearing life.

The geometric relationship between the connecting rods, saddles, and crankshafts in FIGS. 2A and 2B keeps the connecting rods principally under tensile stress as the pistons 12 and 14 move in the cylinder 10, with a limited level of compressive stress resulting from inertial forces of the pistons at high engine speeds. This geometry reduces or substantially eliminates side forces between the pistons and the bore of the cylinder.

In FIGS. 2A and 2B, additional details and features of the cylinder 10 and the pistons 12 and 14 are shown. The cylinder 10 includes an inlet port 46 through which air, under pressure, flows into the cylinder 10. The cylinder also has an exhaust port 48 through which the products of combustion flow out of the cylinder 10. Because of their locations with respect to these ports, the pistons 12 and 14 may be respectively referred to as the "exhaust" and "inlet" pistons, and the ends of the cylinder 10 may be similarly named. A preferred, but by no means the only possible, configuration for the ports 46 and 48 are described below. The operations of the exhaust and inlet ports are modulated by movement of the pistons during engine operation. At least one injection site (not shown in this drawing) controlled by one or more fuel injectors (described below) admits fuel into the cylinder 10.

As the following illustrations and description will establish, the relation between piston length, the length of the cylinder, and the length added to the cylinder bore by the cylinder manifolds, coupled with a phase difference between the pistons as they traverse their bottom dead center positions, modulate port operations and sequence them correctly with piston events. In this regard, the inlet and exhaust ports 46 and 48 are displaced axially from the longitudinal center of the cylinder, near its ends. The pistons may be of equal length. Each piston 12 and 14 keeps the associated port 46 or 48 of the cylinder 10 closed until it approaches its bottom dead center position. The phase offset between the bottom dead center positions produces a sequence in which the exhaust port opens when the exhaust piston moves near its bottom dead center position, then the inlet port opens when the inlet piston moves near its bottom dead center position, following which the exhaust port closes after the exhaust piston moves away from its bottom dead center position, and then the inlet port closes after the inlet piston moves away from its bottom dead center position.

Figure 3A:
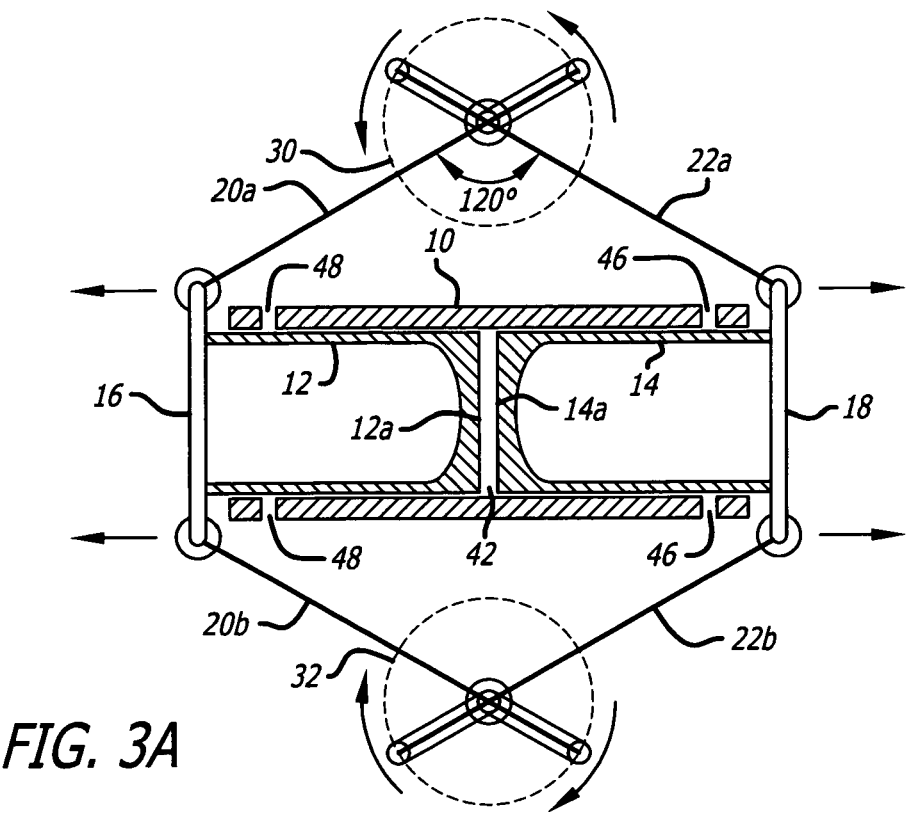
FIGS. 3A–3F are schematic sectional illustrations of the cylinder and pistons of FIGS. 2A and 2B illustrating a complete cycle of the pistons.

FIGS. 3A–3F are schematic representations of the cylinder 10 and pistons 12 and 14 of FIGS. 2A and 2B illustrating a representative cycle of operation ("operational cycle"). In this example, with the pistons at top dead center, the opposing rods on each side of the cylinder form an angle of approximately 120° as shown in FIG. 3A. This geometry is merely for the purpose of explaining an operational cycle; it is not meant to exclude other possible geometries with other operating cycles. For convenience, an operational cycle may be measured rotationally, starting at a crank angle of 0° where the pistons are at top dead center as shown in FIG. 3A and ending at 360°. With reference to FIG. 3A, the term "top dead center" is used to refer to the point at which the closed ends 12a and 14a of the pistons 12 and 14 are closest to each other and to the crankshafts and air is most highly compressed in the cylinder space 42 between the ends. This is the top of the compression stroke of both pistons. Using a convenient measurement, top dead center occurs at 0° of the cycle of operation. Further, with reference to FIGS. 3C and 3E, the term "bottom dead center" refers to the points at which the closed ends 12a and 14a of the pistons 12 and 14 are farthest from the crankshafts 30 and 32. Bottom dead center for the piston 12 occurs just before 180° of the cycle of operation. Bottom dead center for the piston 14 occurs just after 180° of the cycle of operation.

A two-stroke, compression-ignition operational cycle is now explained with reference to FIGS. 3A–3F. This explanation is meant to be illustrative, and uses 360° to measure a full cycle. The events and actions of the cycle are referenced to specific points in the 360° cycle with the understanding that for different geometries, while the sequence of events and actions will be the same, the points at which they occur in the 360° cycle will differ from those in this explanation.

Figure 3B:
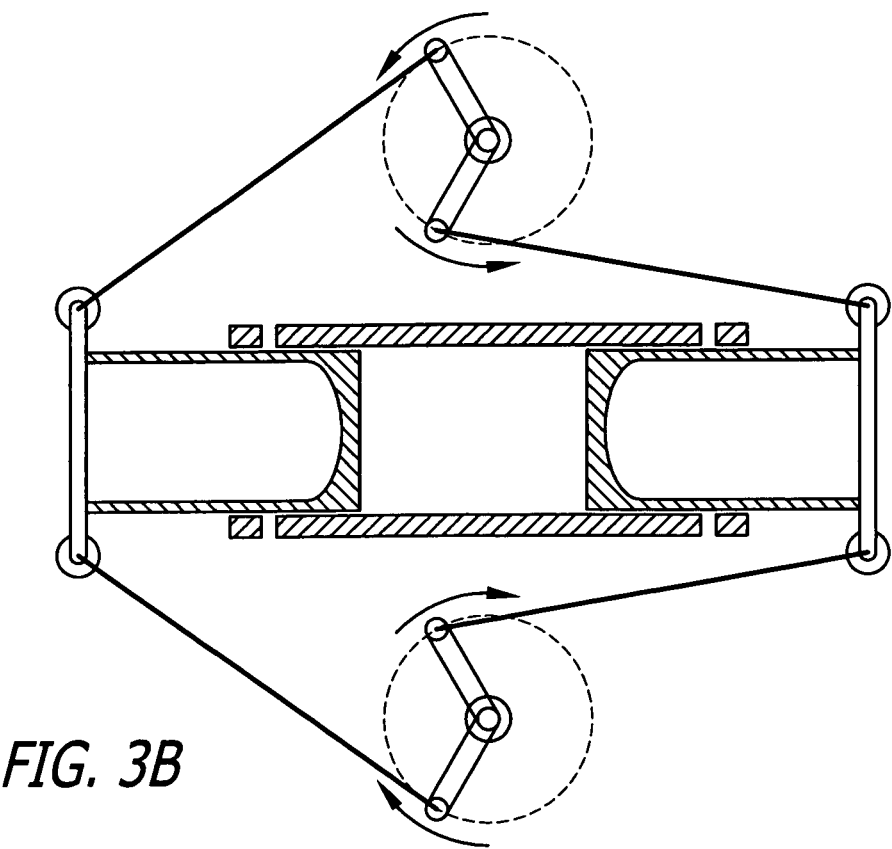
Figure 3C:
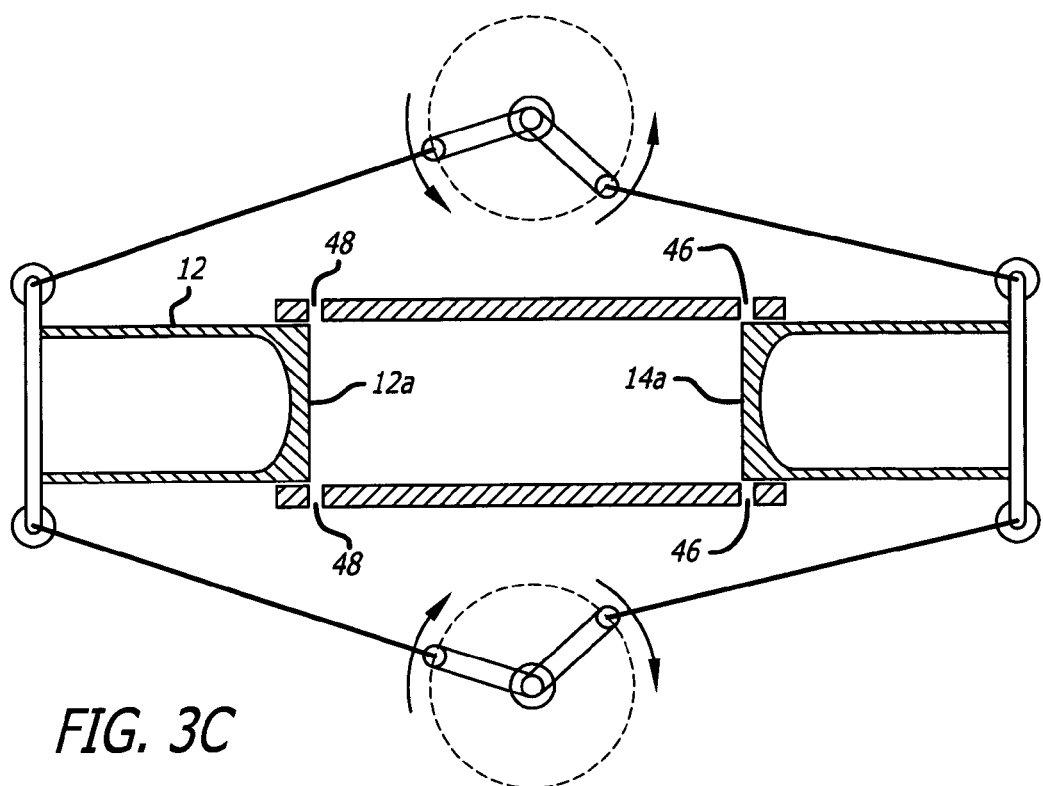
Figure 3D:
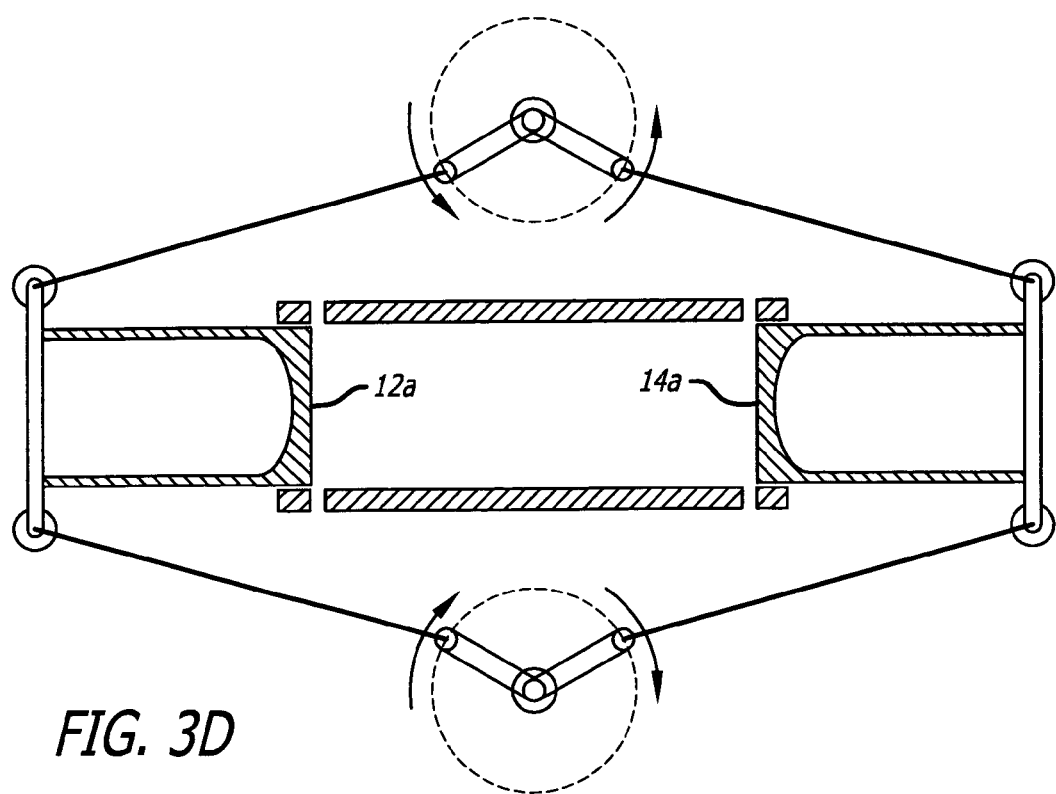
Figure 3E:
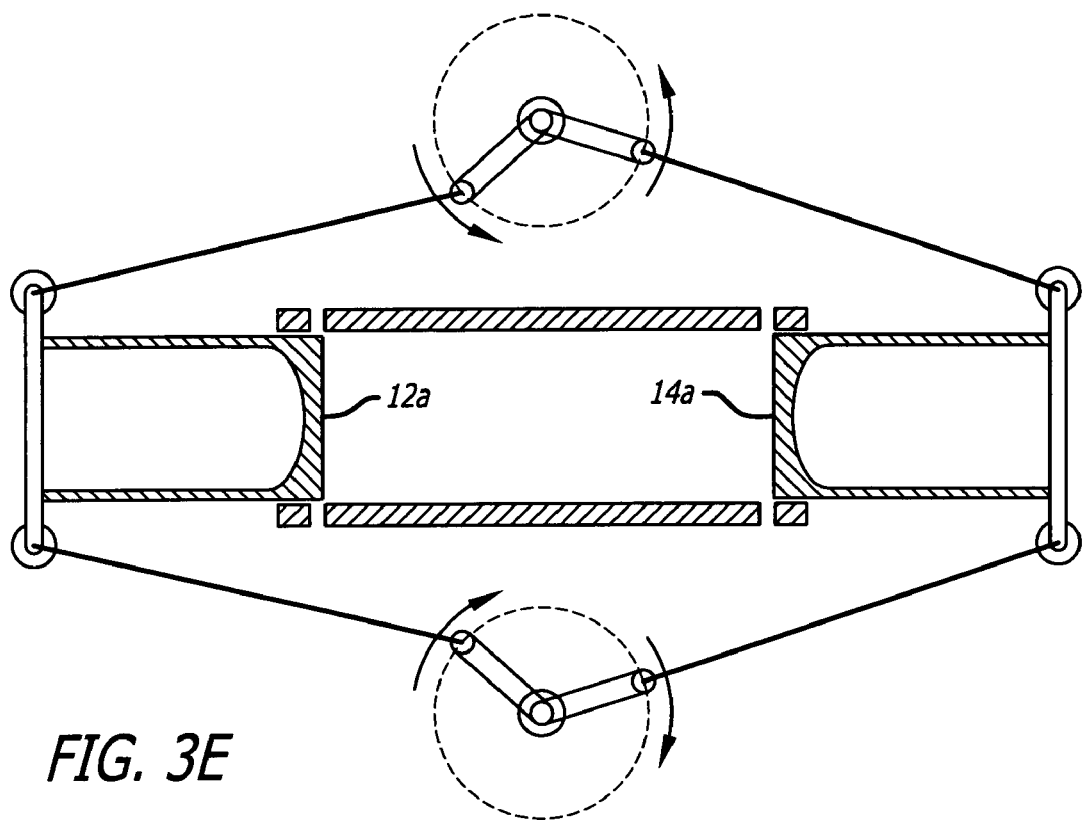
Figure 3F:
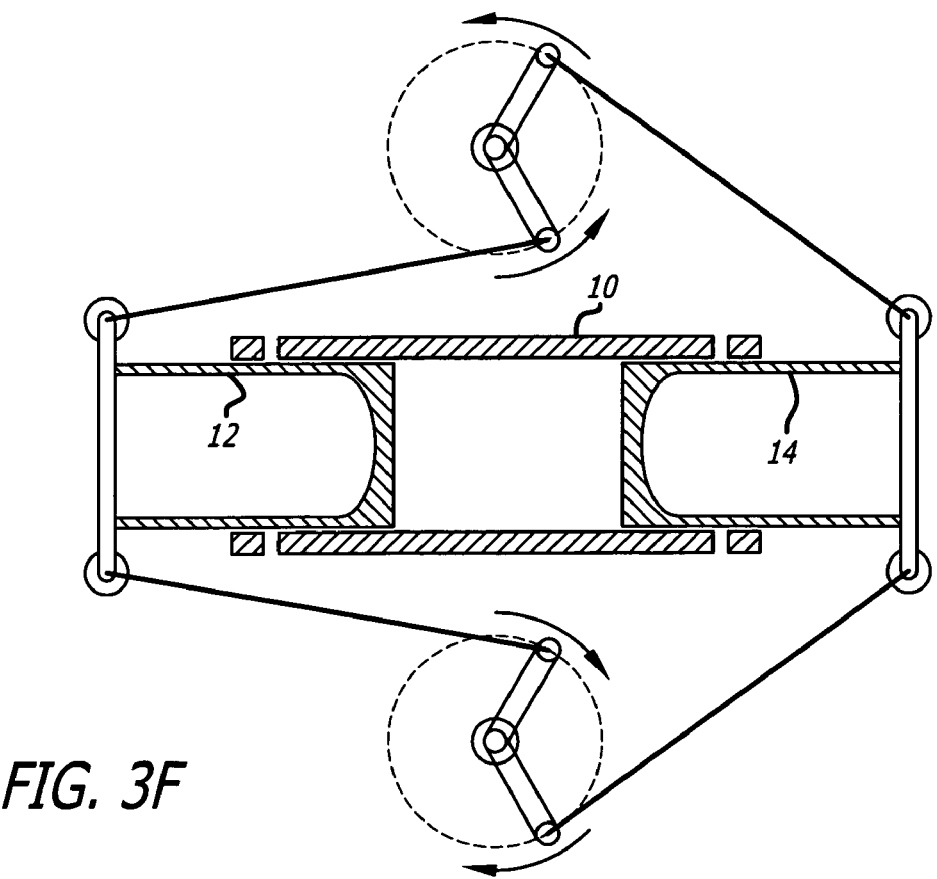

Referring now to FIG. 3A, prior to the 0° reference point in the operational cycle where the pistons 12 and 14 will be at top dead center, fuel is initially injected into the cylinder through the at least one injection site. Fuel may continue to be injected after combustion commences. The fuel mixes with compressed air and the mixture ignites between the closed ends 12a and 14a, driving the pistons apart in a power stroke, to drive the crankshafts 30 and 32 to rotate in opposite directions. The pistons 12 and 14 keep the inlet and exhaust ports 46 and 48 closed during the power stroke, blocking air from entering the inlet port and exhaust from leaving the exhaust port. In FIG. 3B, at 90° in the operational cycle, the pistons 12 and 14, near midway through their power strokes, continue to travel out of the cylinder 10. The inlet and exhaust ports 46 and 48 are still closed. In FIG. 3C, at 167° in the operational cycle, the closed end 12a of the piston 12 has moved far enough out of the cylinder 10 to open the exhaust port 48, while the inlet port 46 is still closed. The products of combustion now begin to flow out of the exhaust port 48. This portion of the cycle is referred to as blow-down. In FIG. 3D, at 180° in the operational cycle, the inlet and exhaust ports 46 and 48 are open and pressurized air flows into the cylinder 10 through the inlet port 46, while exhaust produced by combustion flows out of the exhaust port 48. Scavenging now occurs as residual combustion gasses are displaced with pressurized air. In FIG. 3E, at 193° the exhaust port 48 is closed by the piston 12, while the inlet port 46 is still open due to the phase offset described above and explained in more detail below. Charge air continues to be forced into the cylinder 10 through the inlet port 46 until that port is closed, after which the compression stroke begins. At 270° in the operational cycle, shown in FIG. 3F, the pistons 12 and 14 are near halfway through their compression stroke, and both the inlet and exhaust ports 46 and 48 are closed. The pistons 12 and 14 then again move toward their top dead center positions, and the cycle is continually repeated so long as the engine operates.

Figure 1:
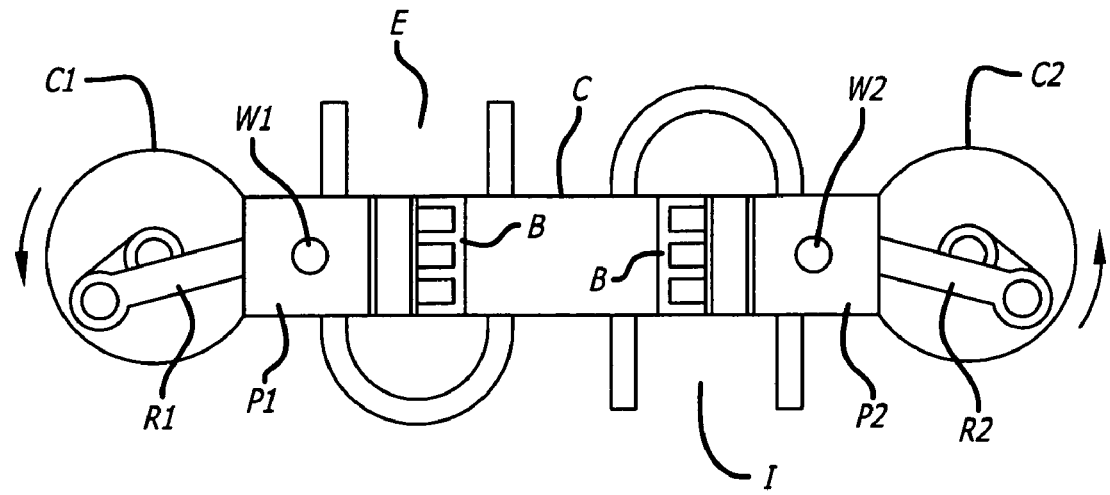
FIG. 1 is a partially schematic illustration of a portion of a prior art opposed piston diesel engine.
Figure 4:
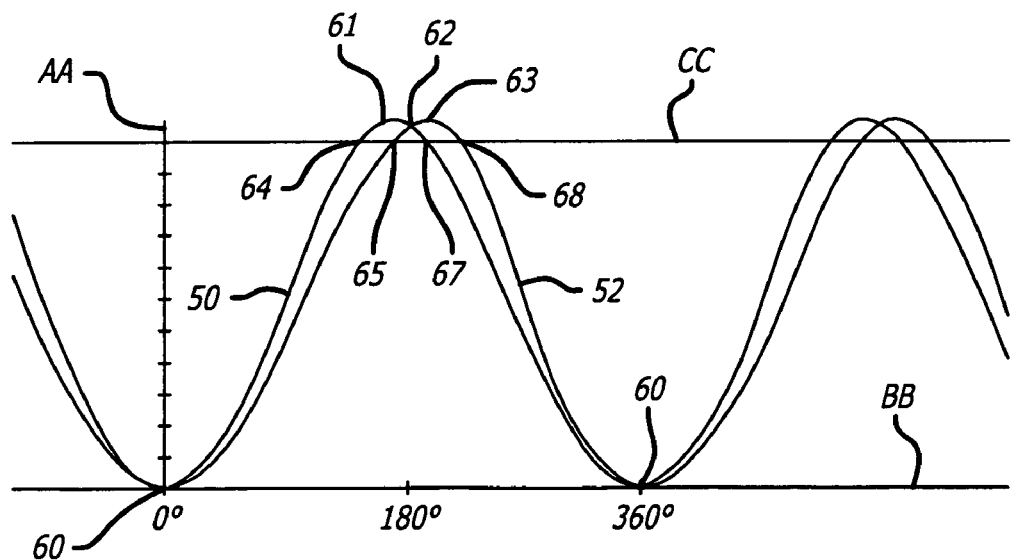
FIG. 4 is a plot showing relative phasing of the two opposed pistons of FIGS. 3A–3F.

FIG. 4 is a plot showing the phases of the pistons 12 and 14 during the representative operational cycle just described. Piston phase may be measured at either crankshaft referenced to the top dead center of each piston. In FIG. 4, the axis AA represents the distance of the crown of a piston from its top dead center position, and the axis BB represents phase. The position of the piston 12 is indicated by the line 50, while that of the piston 14 is indicated by the line 52. At top dead center 60, both of the pistons are in phase and the closed ends 12a and 14a are equally distant from the longitudinal center of the cylinder 10. As the operational cycle proceeds, the piston 12 increasingly leads in phase until it reaches its bottom dead center point 61, just before 180° in the operational cycle, indicated by 62. After the 180° point, the piston 14 passes through its bottom dead center point 63 and begins to catch up with the piston 12 until the two pistons are once again in phase at 360° in the cycle.

The oscillating phase offset between the pistons 12 and 14 illustrated in FIG. 4 enables the desired sequencing of the inlet and exhaust ports 46 and 48. In this regard, the line CC in FIG. 4 represents the position of the crown of a piston where the port controlled by the piston opens. Thus, when the closed end 12a of the piston 12 reaches the point represented by 64 on CC, the exhaust port only begins to open. When the closed end 14a of the piston 14 moves past the point represented by 65 on CC, both ports are open and scavenging takes place. At 67 on CC, the exhaust port closes and cylinder air charging occurs until the piston end 14a reaches the point represented by 68 on CC when both ports are closed and compression begins. This desirable result arises from the fact that the connecting rods for the respective pistons travel through different paths during crankshaft rotation; while one rod is going over the top of one crankshaft, the other is rotating under the bottom of the same crankshaft.

It should be noted with respect to FIG. 4 that the respective opening positions for the exhaust and inlet ports may not necessarily lie on the same line and that their relative opening and closing phases may differ from those shown.

Figure 5A:
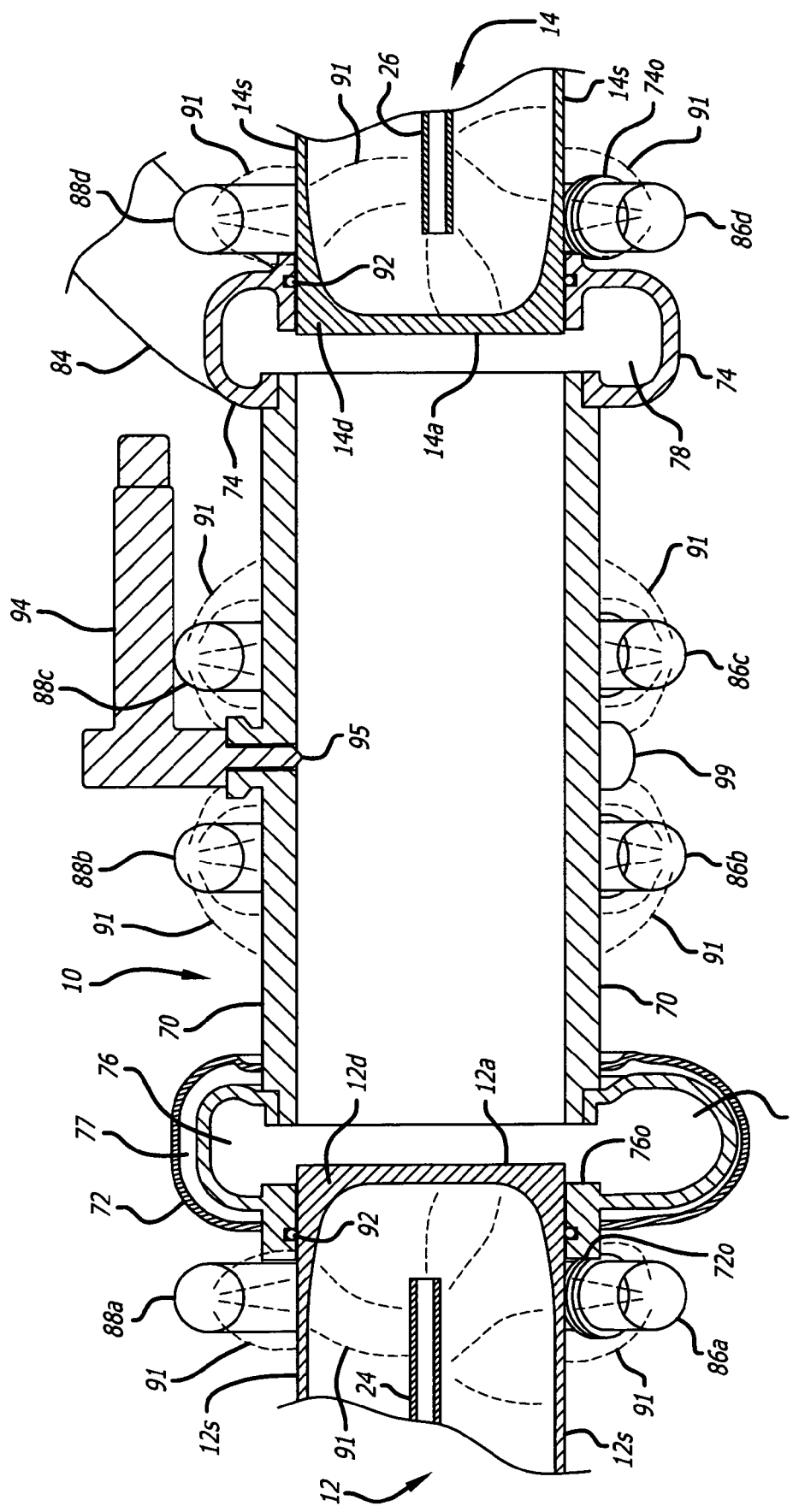
FIG. 5A is a side sectional view of the cylinder with opposed pistons of FIGS. 2A and 2B rotated 90° on its axis.

As seen in FIGS. 2A, 2B, and 5A, the cylinder 10 includes a cylinder tube 70 with opposing axial ends and annular exhaust and intake manifolds 72 and 74, each threaded, welded, or otherwise joined to a respective axial end of the cylinder tube 70. The manifolds 72 and 74 may be denominated the "cylinder exhaust manifold" and the "cylinder inlet manifold", respectively. The manifolds 72 and 74 have respective internal annular galleries 76 and 78 that constitute the exhaust and inlet ports, respectively. Preferably each of the galleries 76 and 78 has the shape of a scroll in order to induce swirling of gasses flowing therethrough, while inhibiting turbulent mixing. Swirling the pressurized air facilitates scavenging and enhances combustion efficiency. The cylinder manifold 72 also includes an annular passage 77 surrounding the annular gallery 76. The annular passage 77 may be connected to receive airflow, or alternatively it may contain stagnant air, to cool the periphery of the manifold 72. When the cylinder manifolds 72 and 74 are joined to the cylinder tube 70, their outer portions extend the bore of the tube. The common bore may be precision machined to closely match the diameter of the pistons 12 and 14, and the pistons and cylinder may be fabricated from materials with compatible thermal expansion characteristics. If ringless pistons (pistons without rings) are used, there is no need for bridges spanning the ports, and a very close tolerance may be obtained between the outer diameters of the pistons and the inner diameter of the common bore. With ringless operation, for example, the spacing between each piston and the bore may be on the order of 0.002" (2 mils or 50 microns), or less. The absence of bridges also facilitates the formation of the intake manifold 74 into a swirl inducing shape such as a scroll. If, on the other hand, the pistons are provided with rings, it will be necessary to form the exhaust and inlet ports as annular passages with annular sequences of openings to the tube 70, thereby providing bridges to support the transit of the rings past the ports. Tubes 82 and 84 formed on the cylinder manifolds 72 and 74 open into the internal annular galleries 76 and 78, providing connection between the exhaust and inlet ports and respective exhaust and inlet manifolds.

FIG. 5A is an enlarged side sectional view of the cylinder 10 with opposed pistons 12 and 14 at their respective positions when the operational cycle is near its 180° point. As shown in these figures, the pistons 12 and 14 are provided without piston rings, although they may be provided with rings if dictated by design and operation. Piston rings are optional elements in this engine, for two reasons. First, piston rings accommodate radial distortion of pistons and cylinders in order to assist in controlling the cylinder/piston seal during engine operation. However, the cylinders illustrated and described in this specification are not cast in an engine block and are therefore not subject to non-uniform distortion from any thermal stress or any mechanical stress generated by other engine components, or asymmetrical cooling elements. As a result the cylinders and pistons may be machined with very tight tolerances for very close fitting, thereby confining combustion and limiting blow-by of combustion products along the interstice between each piston and the cylinder. Second, piston rings act to cool the piston during engine operation. However, while the engine operates, each piston may be cooled by application of liquid coolant because each piston is periodically substantially entirely withdrawn from (or protrudes from) the cylinder as it moves through its bottom dead center position so that liquid coolant can be applied to its external surface. See FIGS. 2B, 3C and 5A in this regard. As a piston moves out of and back into the cylinder, it is showered (by dispensers to be described) with a liquid coolant on the outer surface of its skirt. In addition, liquid coolant is applied (by a dispenser 24 or 26) to its inner surface along its skirt up to and including its crown.

Figure 6A:
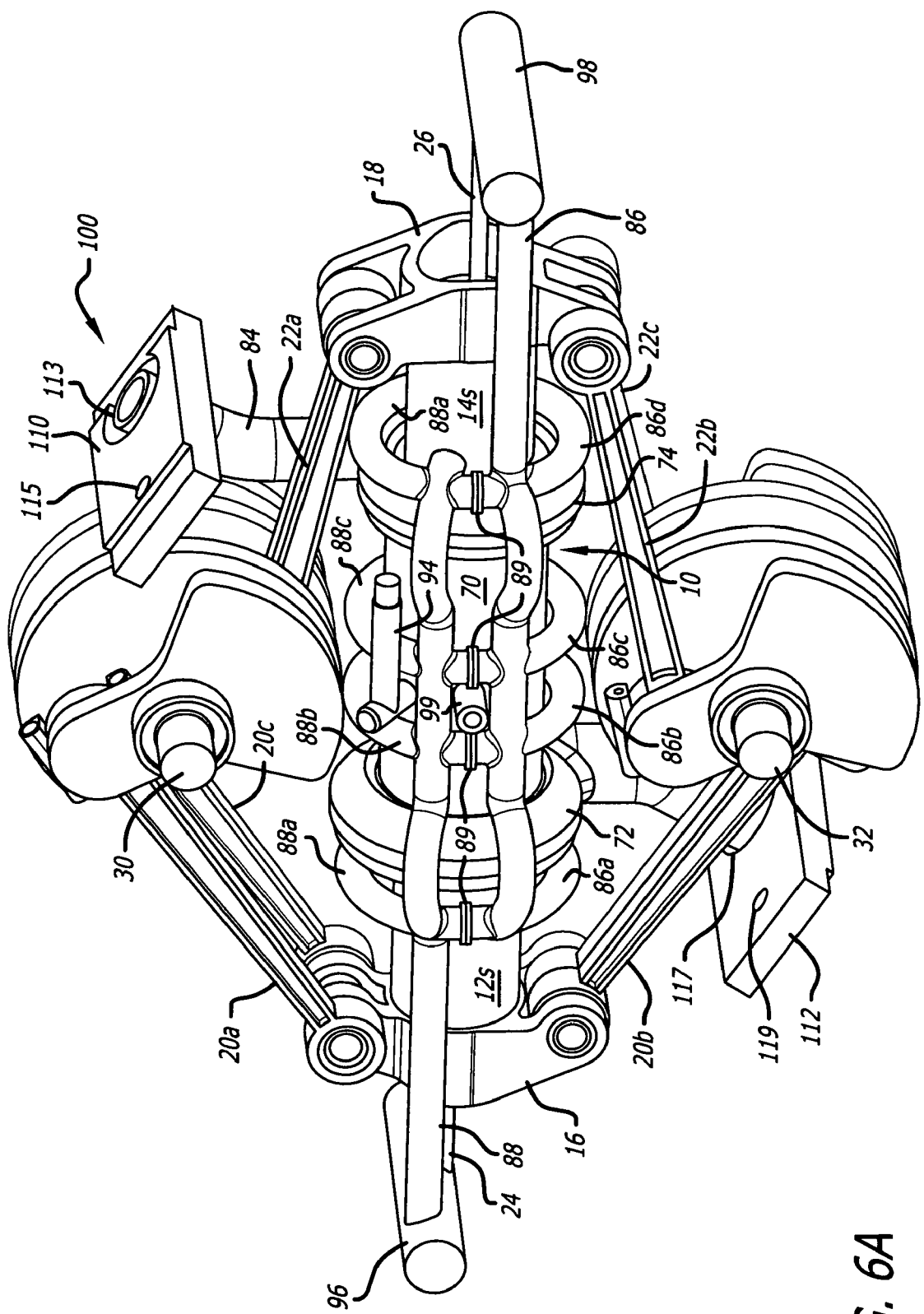
FIGS. 6A and 6B are side perspective views showing increasingly complete stages of assembly of a single cylinder mechanism for an opposed-piston engine.

For example, in FIGS. 5A and 6A, each piston 12 and 14 is substantially withdrawn from the cylinder 10 near its bottom dead center position. Taking the piston 12 as representative, this means that, with the closed end 12a of the piston 12 near the outer edge of the annular gallery 76, the skirt 12s of the piston 12 is substantially entirely withdrawn from the cylinder 10 while only the portion of the piston crown 12d between the outside edge 76o of the gallery 76 and the outside edge 72o of the exhaust manifold 72 remains in the exhaust manifold 72 fitted on the end of the cylinder 10 as described below. It should be noted that each piston 12 and 14 subsequently moves back into the cylinder 10 to the extent that it is substantially enclosed by the cylinder 10 when it reaches its top dead center position.

Thus, at its bottom dead center position, substantially the entire skirt of each piston 12 and 14 protrudes from the cylinder 10 and is exposed for cooling. The detailed description of how that occurs in this illustrative example is not meant to limit the scope of this feature; what is required is that enough of the outside surface of the skirt of each of the pistons 12 and 14 be periodically outside of the cylinder 10 during engine operation to be sufficiently cooled by application of a coolant to the outside surfaces of the skirts outside of the cylinder. The percentage of the piston skirt that is exposed in a particular application may vary based on a number of factors including, for example, system coolant requirements, engine geometry, and designer preference.

As a piston moves in and out of a cylinder it is cooled by application of a liquid coolant (by dispensers to be described) to the outer surface of its skirt. In addition, liquid coolant is applied (by dispenser 24 or 26) to its inner surface along its skirt up to and including its crown. The same liquid coolant is preferably used to cool both the interior and the exterior of the pistons. With reference to FIGS. 5A and 6A, coolant dispensers, preferably made of steel tubing, dispense a liquid coolant onto the pistons 12 and 14 and the cylinder 10 during engine operation. An elongate dispenser manifold 86 extends at least generally axially along and against the cylinder tube and exhaust and inlet manifolds 72 and 74. Four axially spaced semicircular dispensers 86a, 86b, 86c, and 86d extend from the manifold tube halfway around the cylinder 10. The dispenser 86a is positioned outboard of the center of the exhaust manifold 72, near the outside edge 72o; the two dispensers 86b and 86c are located over the cylinder 10 between the manifolds 72 and 74, preferably near the axial center of the cylinder 10 in order to apply proportionately more liquid coolant to the hottest region of the cylinder than to other, cooler regions nearer the manifolds 72 and 74; and the dispenser 86d is located outboard of the center of the inlet manifold 74, near the outside edge 74o. A second dispenser manifold tube 88 extends at least generally axially along and against the cylinder tube and exhaust and inlet manifolds 72 and 74. Four axially spaced semicircular dispensers 88a, 88b, 88c, and 88d extend from the manifold tube 88 halfway around the cylinder 10. The dispenser 88a is positioned outboard of the center of the exhaust manifold 72, near the outside edge 72o; the two dispensers 88b and 88c are located over the cylinder between the manifolds 72 and 74, preferably near the axial center of the cylinder 10 in order to apply proportionately more liquid coolant to the hottest region of the cylinder than to other, cooler regions nearer the manifolds 72 and 74; and the dispenser 88d is located outboard of the center of the inlet manifold 74, near the outside edge 74o. Opposing dispensers are linked together as at 89 for structural integrity. Alternatively, the dispensers may be entirely circular and connected to a single manifold tube. Further, fewer or more dispensers may be provided and may be differently positioned than as shown. Still further, the dispensing branches could be replaced by a number of circumferentially spaced nozzles or sprayers supplied with liquid coolant from a common source.

The dispensers have substantial apertures formed thereinto from which a liquid coolant under pressure is applied to exposed outside surfaces of the skirts of the pistons 12 and 14 and the outside surface of the cylinder tube 70. Preferably, dispensers are positioned near the respective outside edges of the manifolds in order to ensure that liquid coolant is applied to substantially the entire outside surface of the skirt along the axial length of each piston. Depending on factors such as system coolant requirements, engine geometry and designer preference, the dispensers, nozzles, or other suitable coolant application elements may be-repositioned in order to dispense or apply liquid coolant to smaller percentages of the outer radial peripheral surface areas of the skirts. For example, liquid coolant may be applied to the outside or external surface of the skirt along at least 25%, 50%, or 75% of the axial length of each piston.

In FIGS. 5A and 6A, the liquid coolant dispensers that apply liquid coolant to the outside surfaces of the pistons and cylinder are shown as being separate elements; however, one or more dispensers may also be integral with the cylinder manifolds 72 and 74 in addition to, or instead of, the separate elements shown in the figures.

Figure 5B:
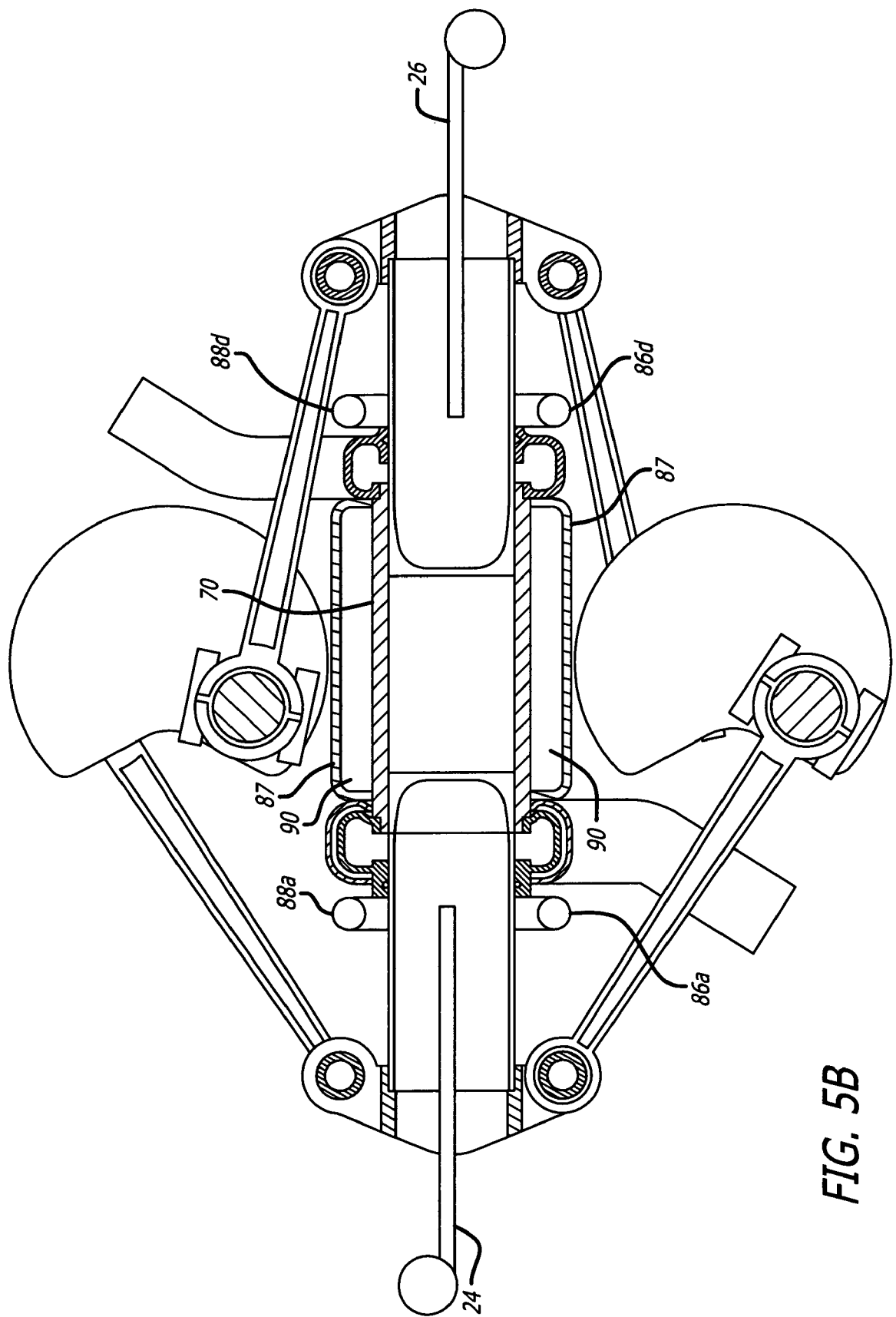
FIG. 5B is the same view of the cylinder in FIG. 5A showing an alternate embodiment for cooling the cylinder.

In an alternate embodiment shown in FIG. 5B, instead of cooling the cylinder tube 70 by way of dispensers, the cylinder tube may be disposed in a jacket 87 to provide a cooling passage 90 around the cylinder through which the coolant may be circulated. In this case, dispensers would still be used to cool the pistons.

The open structure of the saddles 16 and 18 and the absence of wristpins in the pistons permit improved direct application of liquid coolant to the internal surfaces of the pistons. In this regard, as shown in FIGS. 2A, 2B, and 5A, the pistons 12 and 14 are continuously cooled during engine operation by application of liquid coolant through dispensers 24 and 26 to their interior surfaces including their domes along their skirts to their open axial ends.

In FIG. 5A, the flow of liquid coolant onto the pistons and the cylinder is indicated by reference numeral 91.

Continuing with the description of FIG. 5A, annular, high-temperature polymeric rings 92 located in annular grooves near the ends of the manifolds 72 and 74 lightly contact the pistons 12 and 14 and wipe excess lubricant from the pistons as they travel into the cylinder 10. Finally, one or more fuel injectors are provided for the cylinder. For example, the fuel injector 94 is coupled to the at least one injection site 95.

A two-stroke, opposed-piston engine mechanism is next described in which the working elements (cylinders, pistons, linkages, crankshafts, etc.) are received upon a structural unit in the form of a frame of passive structural elements fitted together to support the working elements. The frame is intended to bear the stresses and forces of engine operation, such as compressive forces between the crankshafts. In contrast with many prior art two-cycle, opposed-piston engines, the cylinders are not cast in a block nor are they formed with other passive structural elements. Consequently, the cylinders are not passive structural elements of the engine. Each cylinder is supported in the engine frame principally by the pair of pistons disposed in it. Thus, with the exception of combustion chamber forces, the cylinders are decoupled from the mechanical stresses induced by functional elements, and from the mechanical and thermal stresses of an engine block. Hence, the cylinders are essentially only pressure vessels. This engine construction eliminates non-uniform radial distortion of the pistons and cylinders, permits the cylinder-piston interface to be very close-fitting, and enables a close matching of the thermal characteristics of the materials from which the cylinders and pistons are made. Advantageously, with improved piston cooling, this characteristic affords the option of an engine design that dispenses with piston rings.

Figure 6B:
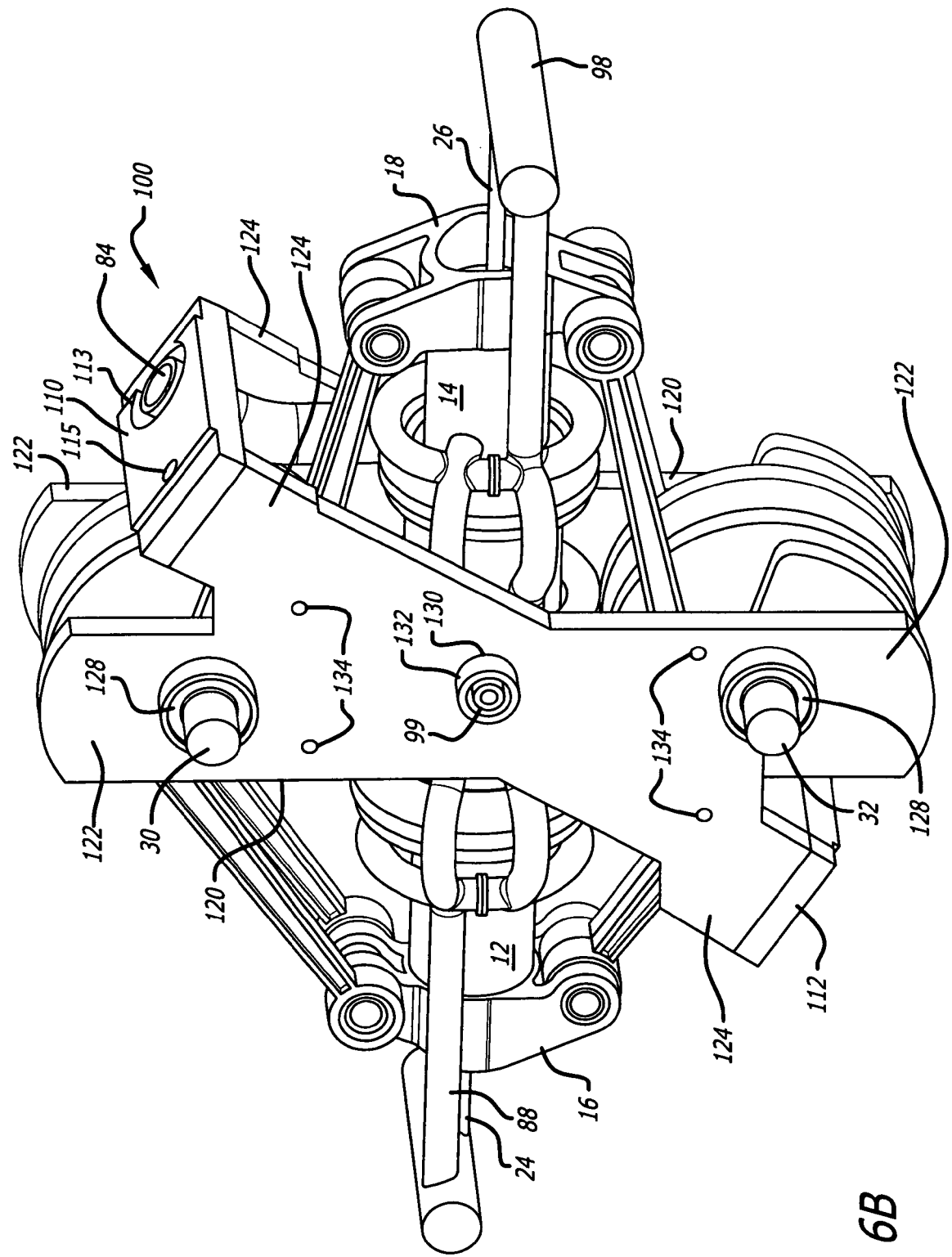
Figure 7A:
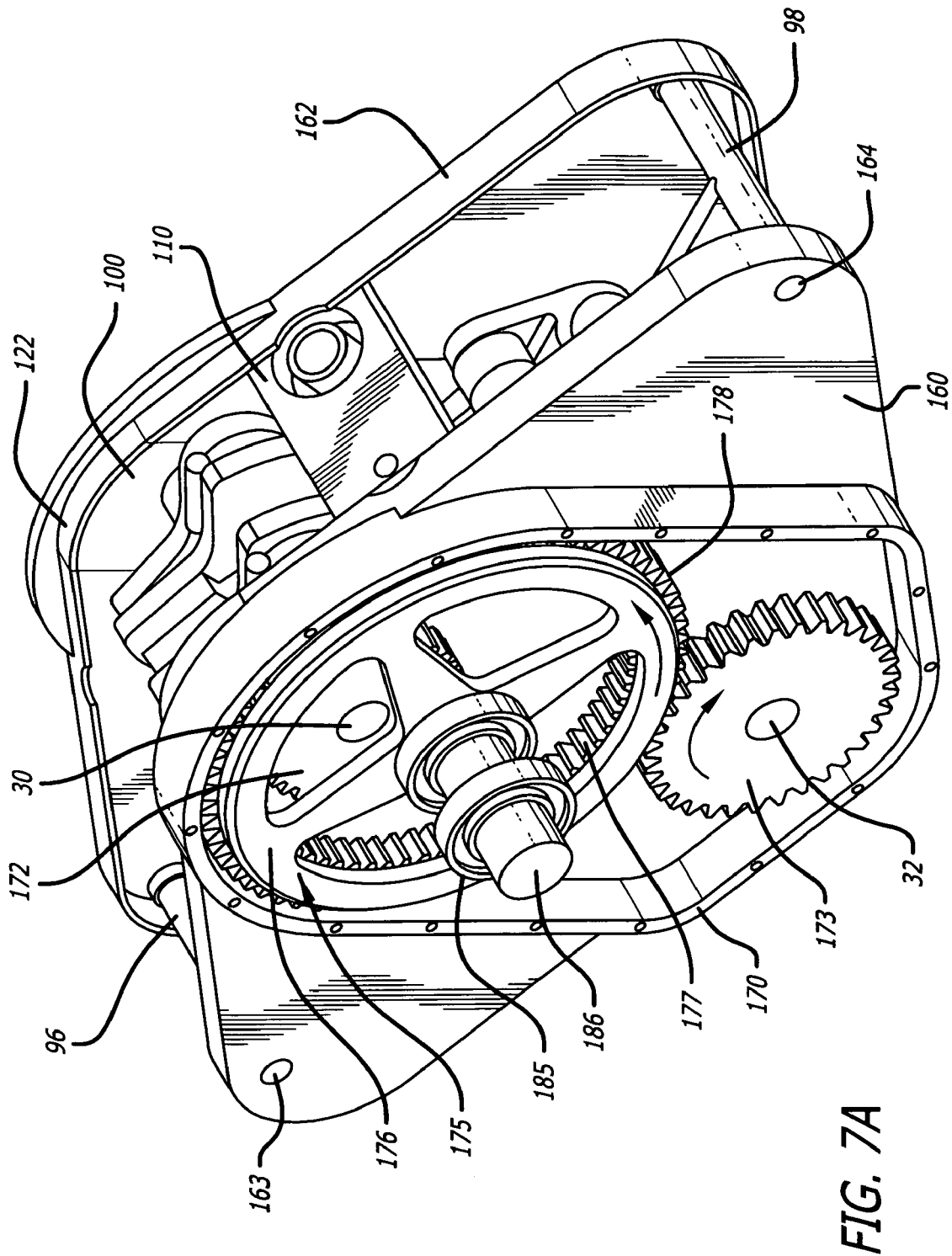
FIGS. 7A–7C are perspective views of a single-cylinder opposed-piston engine module showing assembly details at increasingly complete stages of assembly.
Figure 7B:
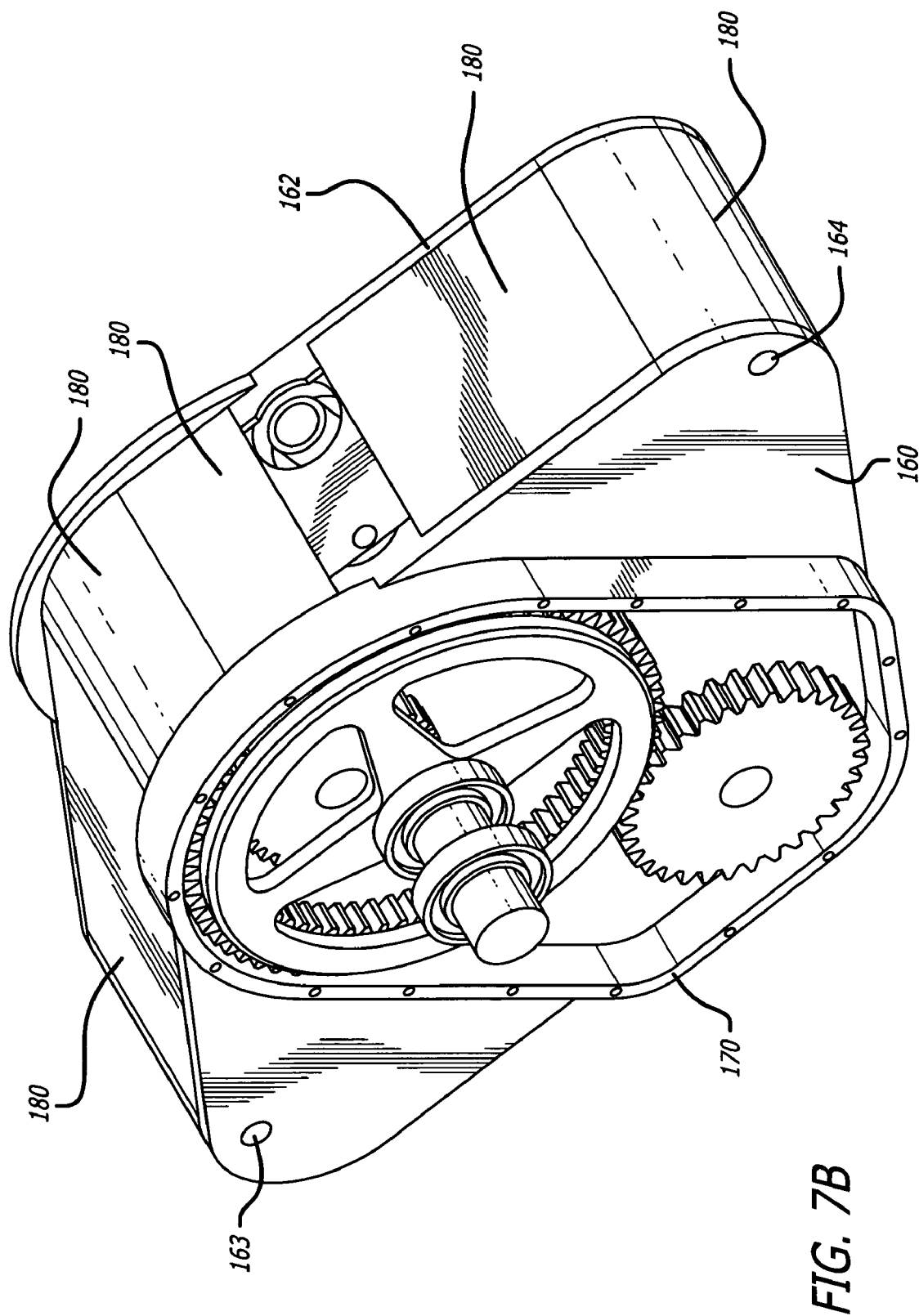
Figure 7C:
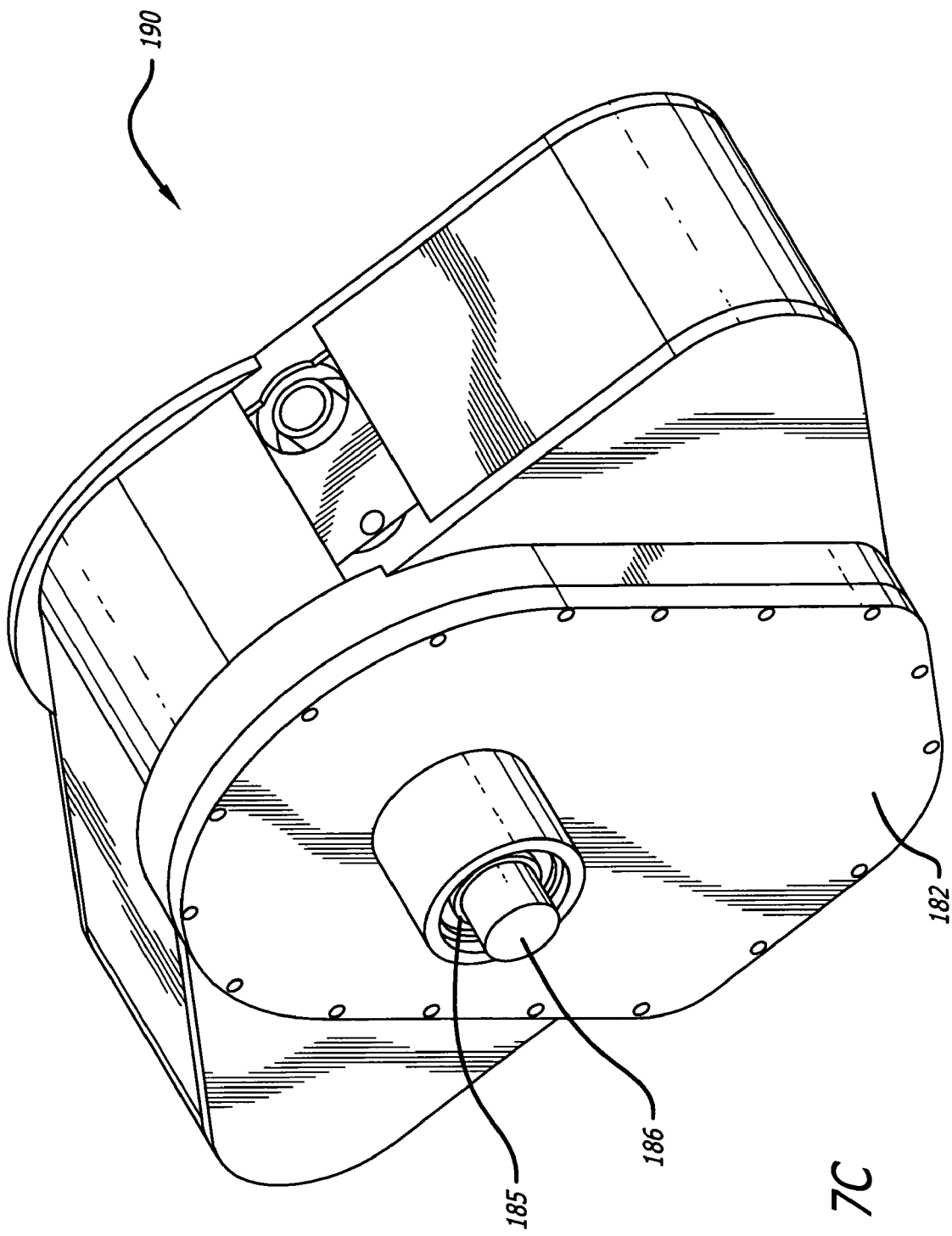
Figure 7D:
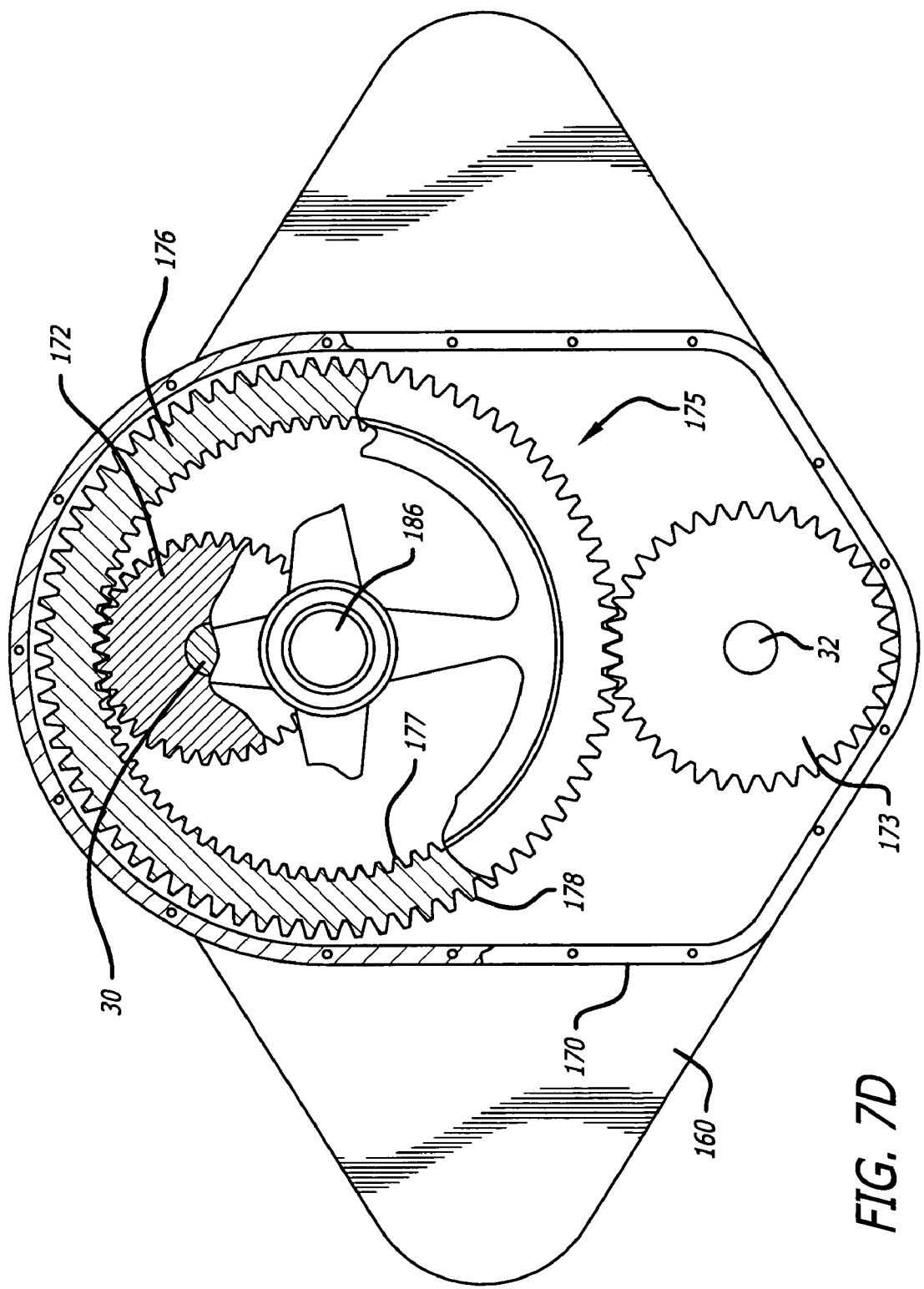
FIG. 7D is an end view of the single-cylinder opposed-piston engine module showing an open gearbox with one gear partially cut away.

FIGS. 6A and 6B are side perspective views showing increasingly complete assembly of a single-cylinder engine mechanism 100 for an opposed-piston engine with side-mounted crankshafts based on the cylinder/piston arrangement of the previous figures. The engine mechanism 100 can be scaled to engines of any size and engines having from one to multiple cylinders. In FIG. 6A, the mechanism 100 includes a single cylinder 10 having the construction illustrated in FIG. 5A, with opposed pistons 12 and 14 disposed in it. The saddles 16 and 18 of the opposed pistons are visible in the figure. The connecting rods 20a and 20c couple the saddle 16 to the crankshaft 30, and the connecting rod pair 20b couples the saddle 16 to the crankshaft 32. The connecting rod pair 22a couples the saddle 18 to the crankshaft 30, and the connecting rods 22b and 22c couple the saddle 18 to the crankshaft 32. The dispenser manifold tube 88 and the dispenser 24 are connected to coolant manifold 96. The manifold tube 86 and the dispenser 26 are connected to another coolant manifold 98. Two radially-opposed alignment pins (one of which is indicated by reference numeral 99) are formed on the cylinder 10 for cylinder stabilization during engine operation. Two beams 110 and 112 are shown in FIG. 6A for reference. The beam 110 has an opening 113 through which the manifold tube 84 can be connected to an air inlet manifold (not shown) and an opening 115 for a tube connecting the fuel injector 94 to a fuel manifold (not shown). The beam 112 has an opening 117 through which the manifold tube 82 can be connected to an exhaust manifold (not shown) and an opening 119 through which a tube can connect another fuel injector (not seen) to a fuel manifold (not shown).

In FIG. 6B, a frame for the engine mechanism 100 includes two support bulkheads 120 disposed on respective sides of the cylinder 10, together with the beams 110 and 112. The bulkheads 120 receive and support the crankshafts 30 and 32. Each bulkhead 120 includes an I-beam section 122 and a transverse section 124. The I-beam sections provide the principal support for the crankshafts during engine operation. The beams 110 and 112 are attached to the ends of the transverse sections 124. The crankshafts are supported for rotation in the I-beam sections 122 by bearings 128. Each bulkhead includes a central opening with a short elastomeric cylinder 132 that receives alignment pins 99 of adjacent cylinders. Threaded holes 134 are provided in each support bulkhead for attachment of additional components, for example, a gearbox.

Assembly of a single-cylinder opposed piston engine module from the engine mechanism 100 of FIGS. 6A and 6B is shown in FIGS. 7A–7D. In the single-cylinder engine module, light aluminum end plates 160 and 162 are attached to respective bulkheads 120 and to each of the beams 110 and 112. The end plate 160 has openings 163 and 164 to receive the liquid coolant manifolds 96 and 98 to feed lines (not shown). FIGS. 7A–7D show a gearbox 170 mounted on a bulkhead (not seen in these figures) through the outside surface of the end plate 160. The gearbox 170 houses an output gear train through which the opposing rotational motions of the crankshafts are coupled to an output drive shaft. The ends of the crankshafts 30 and 32 extend into the gearbox 170. A gear wheel 172 with a toothed outer rim is fixed to the end of the crankshaft 30 and a gear wheel 173 with a toothed outer rim is fixed to the end of the crankshaft 32. An output gear wheel 175 has an annulus 176 with a toothed inside circumference 177 and a toothed outside circumference 178. As seen in these figures, the outer rim of the gear wheel 172 engages the inside circumference 177 of the output gear wheel 175 at one location and the outer rim of the gear wheel 173 engages the outside circumference 178 of the output gear wheel 175 at another location diametrically opposite the one location. The gear ratio between the inner gear 172 and the inside circumference 177 may be $33/65$ with MOD 4 teeth on the inner gear and the inside circumference, while the gear ratio between the outer gear 173 and the outside circumference 178 may be $33/65$ with MOD 5 teeth on the outer gear and the outside circumference. This arrangement of gears permits the opposing rotations of the crankshafts 30 and 32 to be translated into the continuous rotation of the output gear wheel 175 with an odd number of gears (three, in this case), with a non-integral gear ratio, and without any intermediary belts, chains, or other torque transfer elements. The result is a simple, short output gear train.

Assembly of the single-cylinder opposed piston engine module is completed as shown in FIGS. 7A–7D by attachment of light aluminum casing panels 180 to the frame made up of the assembled bulkheads and beams. A cover 182 is fastened to the gearbox 170. The cover 182 includes an output bearing 185 that receives the axle 186 of the output gear wheel 175 thus enabling the frame to support the output gear 175 for rotation. The resulting assembled single-cylinder opposed-piston engine module is indicated by reference numeral 190 in FIG. 7C. The axle 186 constitutes the output drive of the engine module 190. It may be coupled to an intermediate transmission or directly to the driven component by one or more gears, belts, chains, cams or other suitable torque transfer element or system (not shown).

Figure 8A:
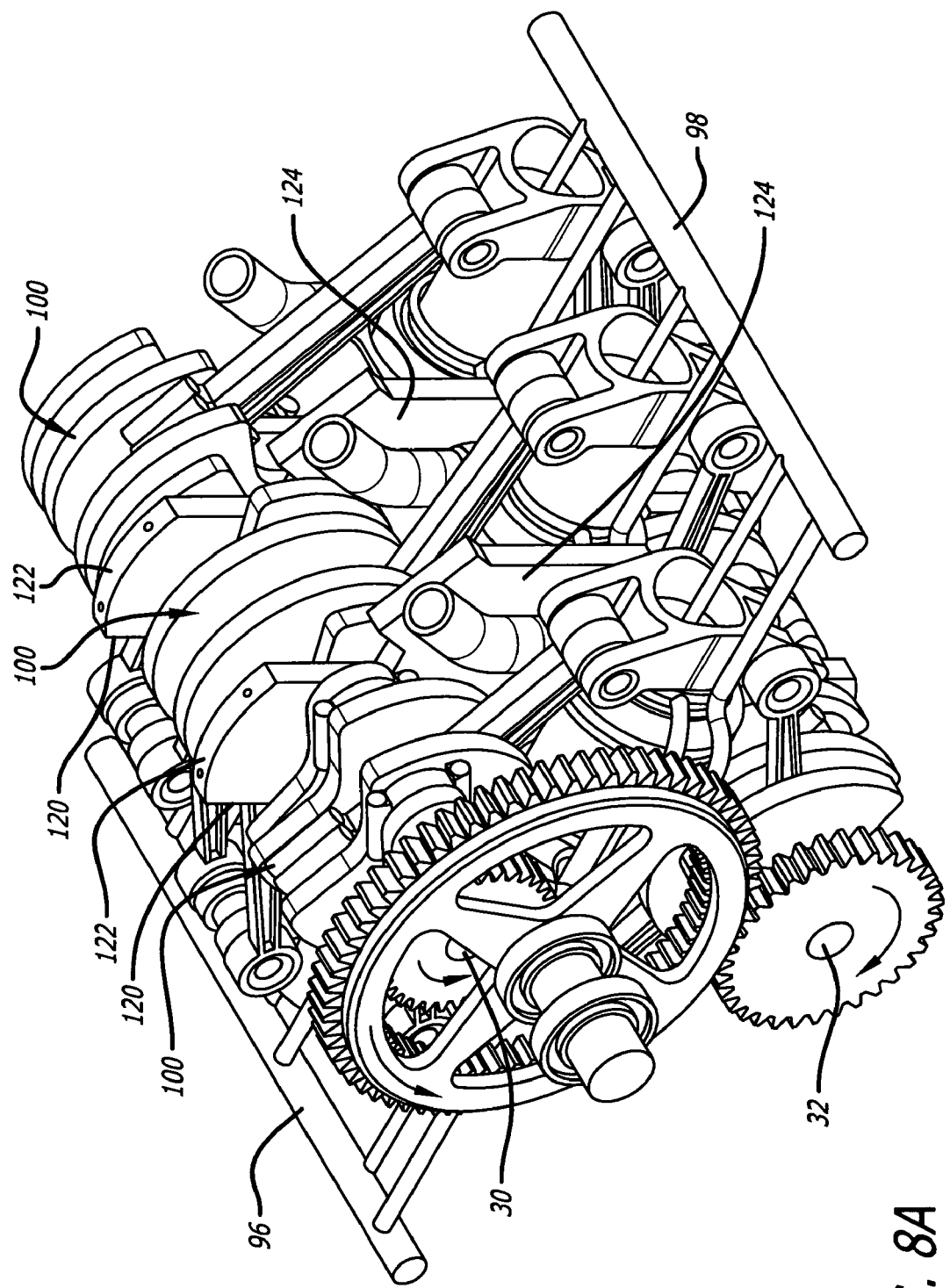
Figure 8C:
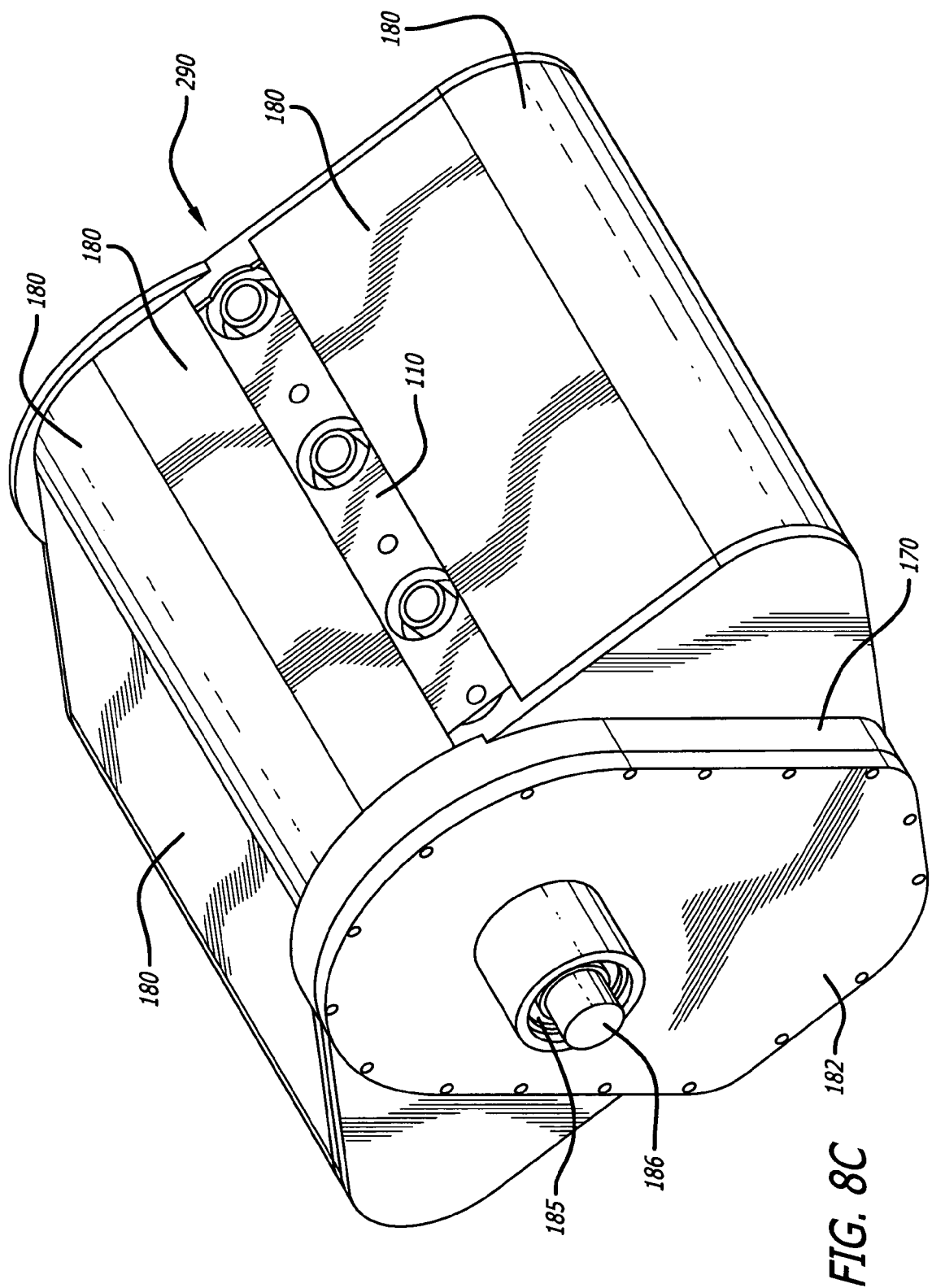

FIGS. 8A–8C illustrate assembly of a multi-cylinder, opposed-piston engine module with three engine mechanisms 100 disposed in a row. Note that the front and rear bulkheads are removed from FIG. 8A for clarity. The mechanisms 100 have the structure already illustrated in FIGS. 6A and 6B, and discussed in respect of the preceding figures. Four bulkheads 120 are provided in the frame of this engine module, each supporting the crankshafts in respective bearings. The frame also includes elongated beams 110 and 112 fixed to the transverse sections of the bulkheads 120. The end plates 160 and 162 close the ends of the engine module. The three-gear drive train is supported for rotation in the gearbox 170. The liquid coolant manifolds 96 and 98 are elongated to span the three engine mechanisms 100. Assembly of the multiple-cylinder opposed piston engine module is completed by attachment of light aluminum casing panels 180 to the frame. A cover 182 is fastened to the gearbox 170. The cover 182 includes an output bearing 185 that receives the axle 186 of the output gear wheel 175 thus enabling the frame to support the output gear wheel 175 for rotation. The resulting assembled multiple-cylinder opposed-piston engine module is indicated by reference numeral 290 in FIG. 8C. The axle 186 constitutes the output drive of the engine module 290.

The best mode for carrying out an opposed-piston internal combustion engine according to the principles thus far described and illustrated includes providing four identical connecting rods for each piston. This mode of practice is best seen in FIG. 6A. In the view of FIG. 6A, on the exhaust port side of the cylinder 10, the two connecting rods 20a and 20c are spaced apart and each is connected at one end to the saddle 16 and at the opposite end to the crankshaft 30. The connecting rod pair 20b comprises two abutting rods, each identical in shape and structure to the rods 20a and 20c. The connecting rod pair 20b is connected at one end to the saddle 16, and at the other end to the crankshaft 32. On the input port side of the cylinder 10, the two connecting rods 22b and 22c are spaced apart and each is connected at one end to the saddle 18 and at the opposite end to the crankshaft 32 on either side of the connecting rod pair 20b. The connecting rod pair 22a comprises two abutting rods, each identical in shape and structure to the rods 22b and 22c. The connecting rod pair 22a is connected at one end to the saddle 18, and at the other end to the crankshaft 30, between the connecting rods 20a and 20c. Thus, on each of the crankshafts, the connecting rod pairs of the pistons on one end of the cylinders are interleaved with the two connecting rods of the pistons on the other end of the cylinders, as shown in FIG. 6A. This provides an optimum balance of forces on the pistons and also reduces the count of part types for the engine. The identical rods also assist in maintaining uniform thermal expansion of the rods during engine operation.

The best mode also includes connecting rods of forged steel or titanium, cylinders and pistons of aluminum-silicon alloy with chrome-plated cylinder bores, liquid coolant-conducting elements of steel tubing, and crankshafts of forged, machined steel. Engine frame parts may be made of lightweight alloys such as aluminum.

Figure 9A:
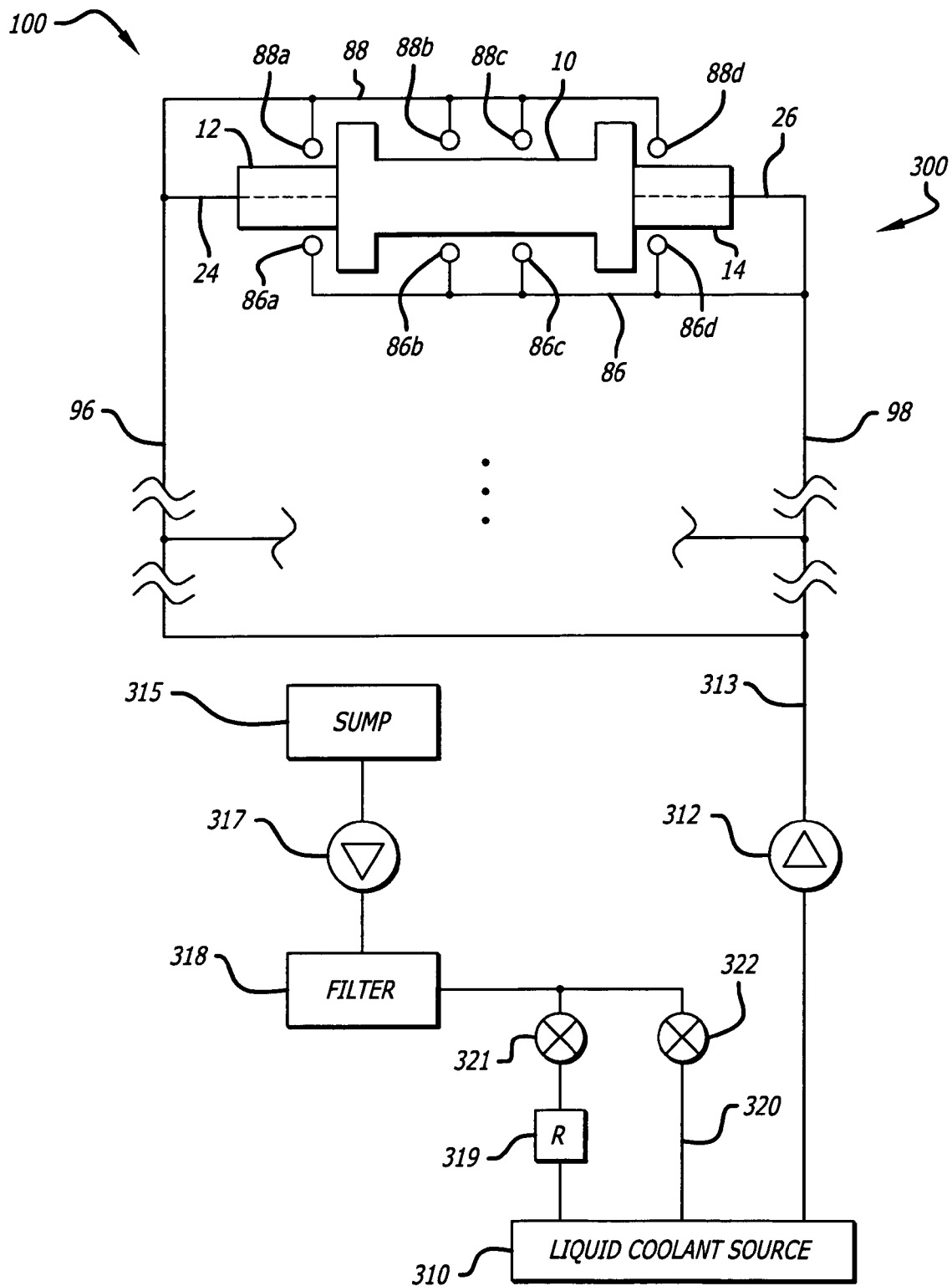
FIG. 9A is a schematic diagram of a supply system for an opposed-piston engine which provides liquid coolant to the engine.

A supply system 300 for supplying a liquid coolant to be dispensed on and in pistons and on cylinders in an opposed-piston engine of one or more cylinders is illustrated in FIG. 9A. The liquid coolant may be any liquid capable of being applied to the pistons and cooling them sufficiently for the desired application. Lubricating oil and diesel fuel are two possibilities. In this figure, a source of liquid coolant 310 is connected to a low-pressure, high-volume pump 312. The pump 312 may comprise, for example, a centrifugal pump providing liquid coolant in the range of 3 to 10 gal/min for a 100 HP engine. which pumps liquid coolant through a distribution line 313 to the manifolds 96 and 98. These manifolds supply a high volume of liquid coolant at low pressure to the dispensers 24 and 26 and to the dispensing manifolds 86 and 88 of one or more modules 100. The liquid coolant is collected by a sump 315 in the opposed-piston engine. A pump 317 connected to the sump pumps the collected liquid coolant through a filter 318 and a radiator 319 back to the source 310. As seen in FIG. 9A, a line 320 may be provided in parallel with the radiator 319. In this case, a valve 321 would control liquid coolant flow through the radiator 319 and a valve 322 would control liquid coolant flow through the line 320. For normal operation, only the valve 321 would be open, permitting liquid coolant to flow through the radiator 319, thereby dissipating the heat of the pistons and cylinders via the radiator 319. For short term boosted operation, the valves 321 and 322 would both be open, thereby dissipating the heat of the pistons and the cylinders via the radiator 319 and absorbing some of the heat in the reservoir of liquid coolant in the source 310. Finally, during emergency operation in the event of radiator failure the valve 321 would be closed and the valve 322 would be open, thereby temporarily diverting the heat of the pistons and cylinders into the reservoir of liquid coolant.

Figure 9B:
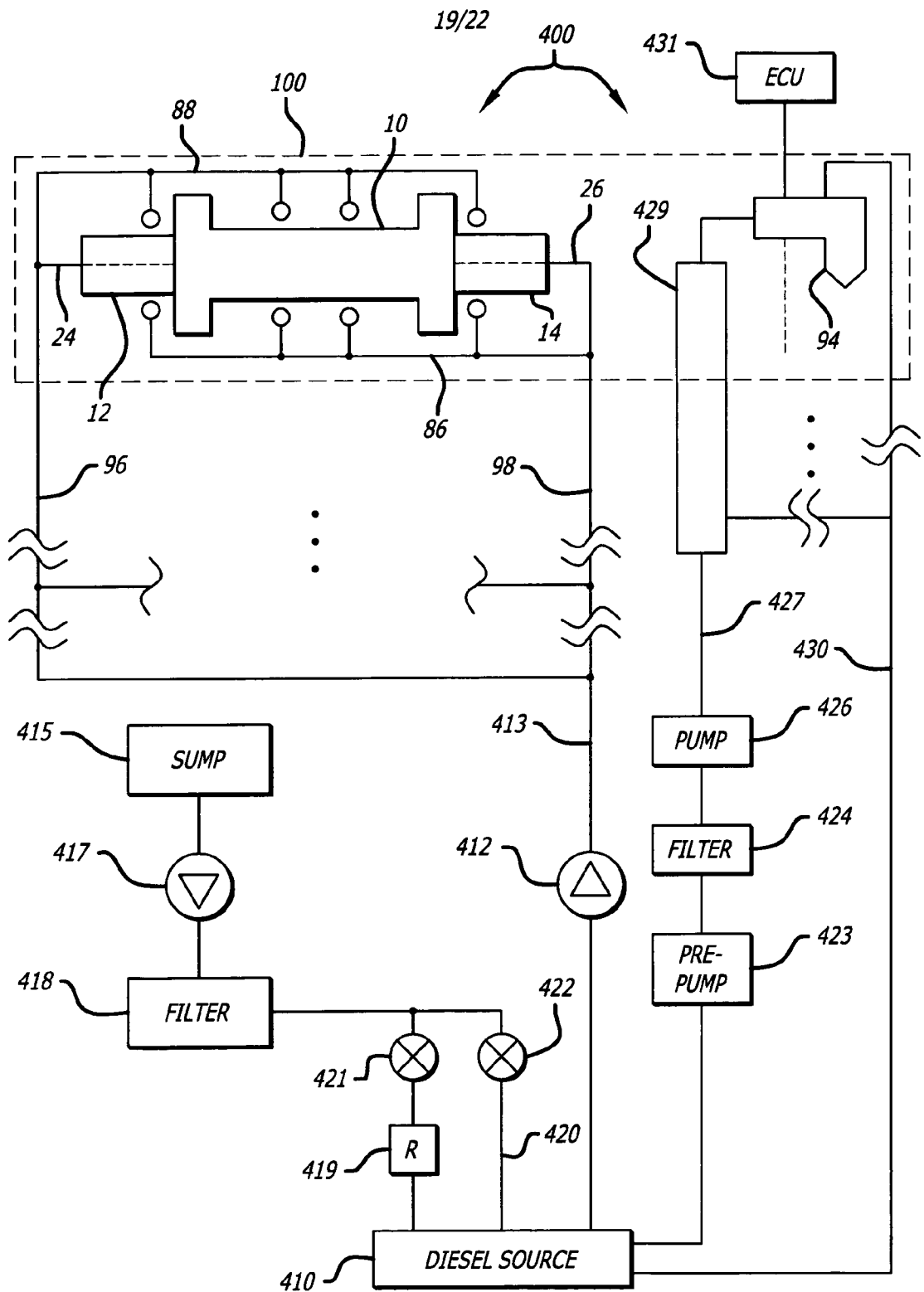
FIG. 9B is a schematic diagram of a combined fuel and coolant supply system for an opposed-piston engine.

If an opposed-piston engine is operated as a compression-ignition engine, fuel injection is the method of delivering diesel fuel to the cylinders for combustion. In this case, diesel fuel also preferably serves as the liquid coolant and as the lubricant for the pistons. It is therefore possible to combine the fueling and coolant sources, eliminating the need for multiple sources. Referring to FIG. 9B, a system 400 for supplying diesel fuel to be dispensed on and in pistons and on cylinders and supplied to fuel injectors in an opposed-piston engine of one or more cylinders is illustrated. In this figure, a source of diesel fuel 410 is connected to a low-pressure, high-volume pump 412 (a centrifugal pump, for example) which pumps liquid coolant through a distribution line 413 to the manifolds 96 and 98. These manifolds supply a high volume of liquid coolant at low pressure to the dispensers 24 and 26 and to the dispensing manifolds 86 and 88 of one or more engine mechanisms 100. The diesel fuel is collected by a sump 415 in the opposed-piston engine. A pump 417 connected to the sump pumps the collected diesel fuel through a filter 418 and a radiator 419 back to the source 410. A return line 420 parallel to the radiator 419 is provided. Valves 421 and 422 control the use of the radiator 419 and return line 420 as explained above in connection with the valves 321 and 322 in FIG. 9A. A pre-pump 423 connected to the source 410 pumps diesel fuel through a filter 424, and to a high-pressure pump 426, which boosts the pressure of fuel delivered to the injectors. For example, the pump 426 may supply diesel fuel at 30,000 psi. The fuel from the pump 426 is supplied through an input fuel line 427 connected to a common rail 429 and the input ports of one or more fuel injectors 94. The return ports of the one or more fuel injectors are returned through line 430 to the source 410. An electronic control unit (ECU) 431 controls the operations of the one or more fuel injectors 94.

Another advantage of an engine built according to this specification is that all of the bearings used to support the crankshafts and connecting rods may be roller bearings. These bearings may be lubricated by being sprayed with diesel fuel, whose lubricity and viscosity at the operating temperatures of an opposed-piston engine are completely adequate for their lubrication.

Thus, by way of the pump 412, the system 400 may deliver diesel fuel as a lubricant for all bearings of the engine, save those in the gearbox 170. In this regard, as diesel fuel supplied from the dispensers, the diesel fuel is churned into a mist within the engine that spreads throughout the engine and works its way between the moving parts of the engine and into the rolling bearings contained within the engine. A single source can then be used to supply such coolant, and lubricant to the engine.

An alternate supply system 350 for supplying a liquid coolant to be dispensed on and in pistons and on cylinders in an opposed-piston engine of one or more cylinders is illustrated in FIG. 9C. This system may be used for dispensing liquid coolant alone as the system 300 in FIG. 9A, or it may be combined with other elements in a system for dispensing diesel fuel to cool, lubricate, and fuel an engine as illustrated in FIG. 9B. The liquid coolant may be any liquid capable of being applied to the pistons and cooling them sufficiently for the desired application. Lubricating oil and diesel fuel are two possibilities. In this figure, an engine enclosure 352 enclosing one or more engine mechanisms 100 contains a sump region 357 where liquid coolant emitted by the above-described dispensers is collected. The liquid coolant collected in the sump region 357 has a nominal operating fluid level 358. A source valve 359 is mounted in the engine enclosure. A level sensor 360 in contact with the liquid coolant collected in the sump region 357 controls a linkage 361 that selects the state of the source valve 359. The source valve 359 has an output connected to a low-pressure high-volume pump 362. The pump 362 may comprise, for example, a centrifugal pump. The source valve 359 has two inputs, a first connected to a feed line 363 from the sump region 358, and a second connected to a feed line 364 from a supply tank 366 containing the liquid coolant. The pump 362 pumps liquid coolant through a feed line 367 to a filter 368 and therethrough to a radiator 369. From the radiator 369, the liquid coolant flows through a feed line 370 to the manifolds 96 and 98. These manifolds supply the high volume of liquid coolant at low pressure to the dispensers 24 and 26 and to the dispensing manifolds 86 and 88 of one or more modules 100. For example, the liquid coolant may be provided in the range of 3 to 10 gal/min for a 100 HP engine. As seen in FIG. 9C, a thermal valve 372 is connected in parallel with the radiator 369 between the output of the filter 368 and the feed line 370. The state of the thermal valve 372 is controlled by the temperature of the liquid coolant or by an emergency circuit 373. The emergency circuit 373 is also connected to the source valve 359. A level valve 375 has an input connected in common with the output of the filter 368, the input of the radiator 369, and the input of the thermal valve 372. The output of the level valve 375 is connected through a feed line 377 to the supply tank 366. The control linkage 361 is also connected to control the state of the level valve 375.

With further reference to FIG. 9C, in normal operation, the level sensor 360 detects the level of liquid coolant in the sump region 357 and selects as a source for the pump 362 either the sump region 357 or the supply tank 366. When the operating level has been reached, the level sensor sets the control linkage 361 to place the source valve in the state where it draws liquid coolant only from the sump region 357. The heated liquid coolant is pumped by the pump 362 through the filter 368 to the radiator 369 and the thermal valve 372. When a design operating temperature of the liquid coolant is achieved, the thermal valve will close partially or fully to modulate the flow of liquid coolant through the radiator 369, thereby regulating the engine temperature. The flow of liquid coolant continues through the feed line 370 to the dispensers where the liquid coolant is applied to remove heat from the engine components. If the level of liquid coolant in the sump region becomes too high, the level sensor 360 causes the control linkage 361 to partially open the level valve 375 to return a portion of the liquid coolant to the supply tank 366 after filtration at 368. In an emergency situation where it is necessary to temporarily bypass the radiator 369, the emergency circuit 373 fully opens the thermal valve 372, thereby shunting the radiator 369, and forces the source valve 359 to initially draw liquid coolant from the supply tank 366. The excess liquid coolant that accumulates in the sump region 357 will be removed by the level valve in response to the level sensor 360. For temporary maximum performance, the thermal valve 372 is closed, thereby utilizing the full capacity of the radiator 369, while the state of the source valve 359 is set to draw fluid only from the supply tank 366.

Figure 10:
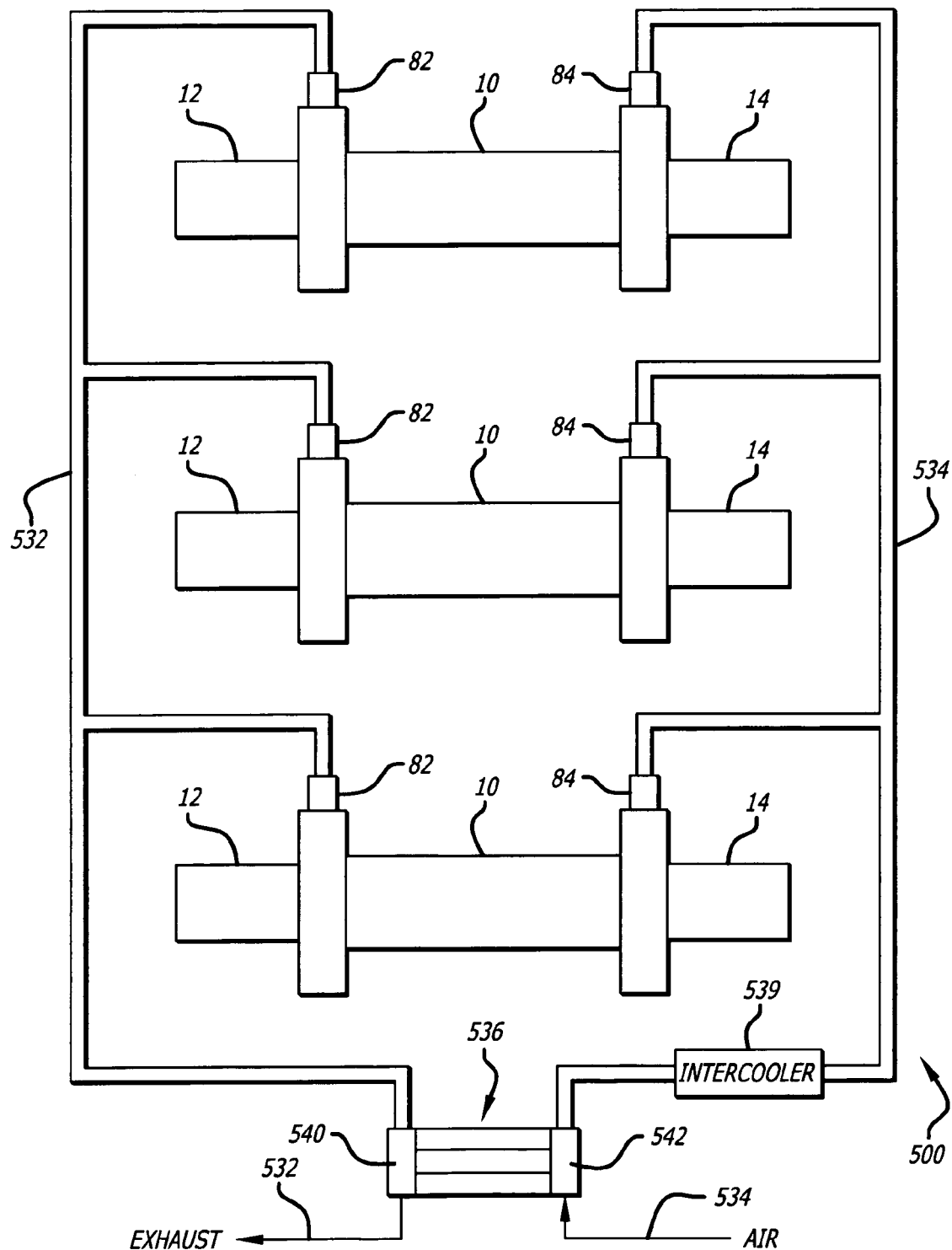
FIG. 10 is a schematic diagram of gas flow in an opposed-piston engine.

A system 500 for providing charge air to and discharging exhaust gasses from an opposed-piston engine is illustrated in FIG. 10. The system may scale to serve one or more cylinders 10. In the system 500, an air inlet manifold line 534 and an exhaust outlet manifold line 532 are respectively connected to the inlet port tubes 84 and the exhaust port tubes 82 of one or more modules. These manifold lines are preferably mounted outside the engine enclosure. The engine schematically illustrated in FIG. 10 is a turbo-supercharged or supercharged engine. Thus, the manifold lines are connected to a turbo-supercharger 536. Specifically, the exhaust gases moving through the exhaust manifold line 532 drive a turbine 540 en route to an output line 538 to mechanically drive a compressor 542. The compressor 542 draws air in on an air inlet line 537 and pressurizes the intake air before directing air to the inlet manifold line 534 by way of an intercooler 539.

Other engine elements not included in the illustrations will be provided according to specific circumstances of each application of this opposed-piston engine. In this regard, the gearbox 170 may be sealed and self-lubricated by oil or may be lubricated separately from the rest of the engine. Alternately, it could be left open and lubricated by the coolant/lubricant used to cool and lubricate the pistons, provided that a suitable lubricant is employed.

In prior engines, as the BMEP increases, friction at the piston ring/cylinder interface increases and the interface temperature rises. The increasing interface temperature ultimately results in heat flowing back into the piston from the interface rather than from the piston to the interface. As a consequence, the rings no longer cool the piston. Assuming maximum flow of coolant to the inside surfaces of the piston skirt and crown, the only remaining piston surfaces to cool are the exterior surfaces of the skirt and crown. The exterior surface of the crown is a component of the combustion chamber and is only marginally cooled by combustion gas expansion and scavenging airflow; this surface is otherwise inaccessible to external cooling. In prior art engines, the exterior surface of the piston skirt is also inaccessible to piston cooling because the piston is encased in the cylinder. However, with periodic exposure of the external surface of the piston skirt by substantially withdrawing the piston from the cylinder bore, that surface is available for cooling. As a result, on the order of twice the amount of heat transfer is achievable when compared with cooling only the inside surfaces of the piston skirt and crown. Enhanced engine performance is thereby realized, with the result that opposed-piston engines constructed according to this specification are capable of achieving improved BMEP, specific output, and PWR when compared with prior art opposed-piston engines. For example an opposed-piston engine constructed according to this specification will tolerate BMEP of at least 200 psi, at least 250 psi, or at least 300 psi due to improved cooling. Such an opposed-piston engine is capable of providing specific power densities (SPD) of at least 11.0 HP/in$^2$, at least 12.0 HP/in$^2$, or at least 13.0 HP/in$^2$. These improvements enable this opposed-piston engine to achieve a PWR of at least 0.5 HP/lb., at least 0.667 HP/lb, or at least 1.0 HP/lb.

Figure 11A:
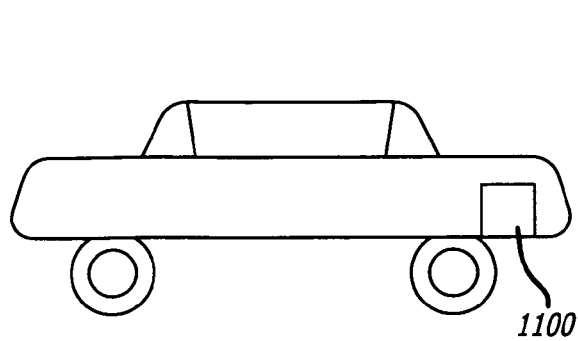
FIGS. 11A–11F illustrate applications of the opposed-piston engine.
Figure 11B:
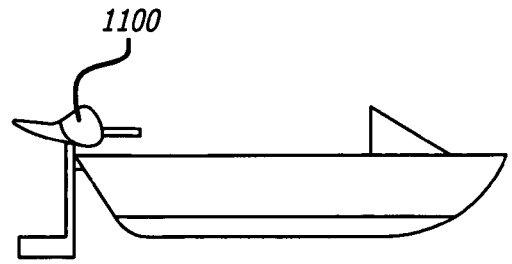
Figure 11C:
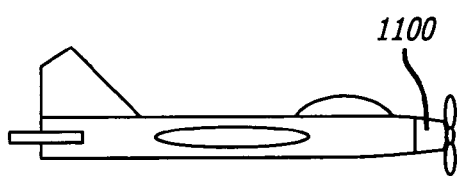
Figure 11D:
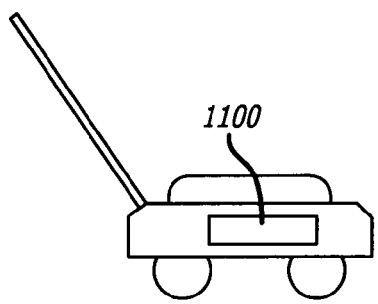
Figure 11E:
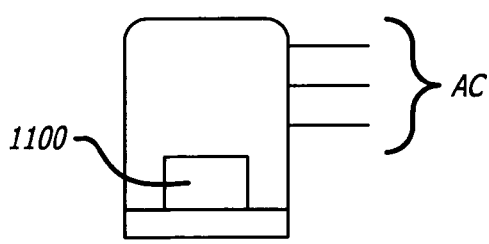
Figure 11F:
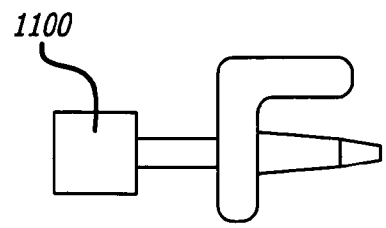

The uses and applications of this opposed-piston engine are manifold. It can be scaled for any application using two-cycle engines, including two-cycle diesel engines. The engine can be installed in or mounted on a variety of powered vehicles, tools, devices, or other apparatus requiring the delivery of rotary power. See FIGS. 11A–11D for examples in this regard. In FIG. 11A, this two-cycle opposed-piston engine 1100 is installed in a surface vehicle, which can include wheeled or tracked vehicles, such as automobiles, motorcycles, scooters, trucks, tanks, armored military vehicles, snow-mobiles, and all equivalent and similar instances. In FIG. 11B, this engine is installed in a water-going vehicle such as a boat, hovercraft, submarine, personal water craft, and all equivalent and similar vehicles. In FIG. 11C, this engine is installed in a fixed or rotary-wing aircraft. In FIG. 11D, this engine is installed in a powered implement such as a lawnmower, edger, trimmer, leaf blower, snow blower, chain saw, and all equivalent and similar devices. In FIG. 11E, this engine is installed in an electrical power generating device. In FIG. 11F, the engine is installed in a pumping device.

Although the invention has been described with reference to specific illustrations and examples, it should be understood that various modifications can be made without departing from the spirit of the principles of our engine. Accordingly, the invention is limited only by the following claims.

The invention claimed is:

1. An internal combustion engine, comprising:
a cylinder with an internal bore;
first and second opposed pistons for reciprocating in the bore so as to protrude from the bore during at least a portion of an operating cycle of the engine;
each piston including a crown and a skirt with inner and outer surfaces; and
a liquid coolant supply system including dispensing means for applying a liquid coolant to an external portion of the outer surface of the skirt of each piston that protrudes from the bore.

2. The engine of claim 1, wherein the liquid coolant comprises diesel fuel.

3. The engine of claim 1, wherein the liquid coolant comprises a lubricant.

4. The engine of claim 1, wherein the cylinder includes an exhaust manifold at a first end and an inlet manifold at a second end and the dispensing means includes dispensers outboard of the exhaust and inlet manifolds.

5. The engine of claim 4, wherein the dispensing means further includes dispensers between the exhaust and inlet manifolds for applying liquid coolant to the cylinders.

6. The engine of claim 5, wherein the liquid coolant supply system further includes a low-pressure, high-volume pump to supply liquid coolant to the dispensers.

7. The engine of claim 4, wherein the engine includes roller bearings and the pump supplies lubricant for the bearings.

8. The engine of claim 1, wherein the external portion includes substantially all of the outer surface of the skirt.

9. The engine of claim 8, wherein the liquid coolant comprises a fuel.

10. The engine of claim 9, wherein the engine is a two-stroke compression-ignition engine and the fuel comprises diesel fuel.

11. The engine of claim 1, wherein the dispensing means includes dispensers for applying the liquid coolant to the interior of each piston.

12. The engine of claim 11, wherein each piston is a hollow piston lacking a wristpin and wherein the dispensers are aimed to apply the liquid coolant to an inner surface of the crown of each piston.

13. The engine of claim 11, wherein the dispensers are aimed at the crowns of the pistons.

14. The engine of claim 13, wherein the pistons are ringless pistons.

15. The engine of claim 1, wherein the pistons are ringless pistons.

16. The engine of claim 15, wherein the cylinder has inlet and exhaust ports.

17. The engine of claim 16, wherein the cylinder lacks bridges spanning the ports.

18. The engine of claim 15, wherein the inlet and exhaust ports are formed from open annular galleries disposed adjacent opposite ends of the cylinder.

19. The engine of claim 1, wherein the dispensing means includes dispensers for applying the liquid coolant to the cylinder.

20. The engine of claim 1, wherein the cylinder does not constitute a structural component of the engine.

21. The engine of claim 1, further comprising:
first and second side-mounted crankshafts; and
rods which connect the pistons to the crankshafts.

22. The engine of claim 21, wherein the rods are subjected primarily to tensile forces during operation of the engine.

23. The engine of claim 21, wherein the cylinder has inlet and exhaust ports, and wherein the crankshafts, the rods, and the inlet and exhaust ports are arranged such that the pistons are in phase in their top dead center positions and offset in phase in their bottom dead center positions.

24. The engine of claim 21, further comprising a frame supporting the crankshafts for rotation.

25. The engine of claim 24, wherein the frame supports compressive forces between the crankshafts.

26. The engine of claim 21, wherein the engine is a two-stroke compression-ignition engine.

27. The engine of claim 21, the cylinder including inlet and exhaust ports.

28. The engine of claim 27, the cylinder further including manifolds, wherein the inlet and exhaust ports open into respective manifolds, and each manifold has a shape that induces swirl.

29. The engine of claim 1, the cylinder including inlet and exhaust ports.

30. The engine of claim 1, wherein the engine is installed in a machine.

31. The engine of claim 1, wherein the engine is installed in a vehicle.

32. The engine of claim 31, wherein the vehicle is a water craft.

33. The engine of claim 31, wherein the vehicle is an aircraft.

34. The engine of claim 31, wherein the vehicle is a surface vehicle.

35. The engine of claim 1, wherein the engine is installed in a power tool.

36. The engine of claim 1, further comprising first and second counter rotating crankshafts, the engine further including:
a first gear on the first crankshaft;
a second gear on the second crankshaft; and,
a third gear supported on the frame, the third gear having an annulus with an outside circumference engaging the first gear at a first location and an inside circumference engaging the second gear at a second location opposite the first location.

37. An internal combustion engine, comprising:
a cylinder with an internal bore;
first and second opposed pistons for reciprocating in the bore so as to be substantially withdrawn from the bore during at least a portion of an operating cycle;
each piston including crown and a skirt with external and internal surfaces; and
a liquid coolant supply system including dispensing means for applying a liquid coolant to a portion of each piston that protrudes from the bore;
the portion including substantially all of the external surface of the skirt.

38. An internal combustion engine, comprising:
a cylinder with an internal bore;
wherein the cylinder does not constitute a structural component of the engine;

first and second opposed pistons for reciprocating in the bore so as to be substantially withdrawn from the bore during at least a portion of an operating cycle; and each piston including a crown and a skirt with external and internal surfaces; and a liquid coolant supply system for supplying a liquid coolant under pressure;

dispensing means in the liquid coolant supply system for applying the liquid coolant to a portion of the external surface of the skirt of each piston that protrudes from the bore.

39. An internal combustion engine, comprising:

a cylinder with an internal bore and two ends;

first and second opposed pistons for reciprocating in the bore so as to be substantially withdrawn from the bore during at least a portion of an operating cycle;

each piston including a crown and a skirt with external and internal surfaces; and a liquid coolant supply system for supplying a liquid coolant;

the liquid coolant supply system including dispenser means outboard of the ends of the cylinder for applying the liquid coolant to an external portion of each piston that protrudes from the bore.

40. An internal combustion engine, comprising:

a cylinder with an internal bore;

first and second opposed pistons for reciprocating in the bore so as to be substantially withdrawn from the bore during at least a portion of an operating cycle; and each piston including a crown and a skirt with external and internal surfaces; and means for applying a liquid coolant to a portion of the external surface of the skirt of each piston that protrudes from the bore.

41. An internal combustion engine, comprising:

at least one cylinder;

a pair of opposed pistons in the at least one cylinder;

each piston including a crown and a skirt with external and internal surfaces;

a pair of side-mounted crankshafts;

a plurality of rods linking each piston to both crankshafts for moving in response to primarily tensile forces acting between the pistons and the crankshafts;

the engine characterized by an engine cycle in which each piston is substantially withdrawn from the cylinder and then driven back into the cylinder;

a liquid coolant supply system for supplying a liquid; and, dispenser means connected to the liquid coolant supply system for applying the liquid coolant to the external surface of the skirt of each piston that is withdrawn from the at least one cylinder.

42. The engine of claim 41, further including a frame adapted to support the crankshafts for rotation.

43. The engine of claim 41, the at least one cylinder including:

a radially symmetric tube with two ends;

a first manifold mounted to the tube at a first end;

a second manifold mounted to the tube at a second end;

an exhaust port in the first manifold;

an inlet port in the second manifold; and at least one fuel injection element in the tube.

44. The engine of claim 43, the exhaust port including an annular gallery in the first manifold and the inlet port including an annular gallery in the second manifold.

45. The engine of claim 43, the dispenser means including first dispensers for applying the liquid coolant to the external surfaces of the skirts of the pistons which are outside the cylinder during the engine cycle.

46. The engine of claim 45, further including second dispensers connected to the liquid coolant supply system for applying the liquid coolant to internal surfaces of the pistons.

47. A combination for an internal combustion engine, including:

a radially symmetric cylinder;

a pair of opposed pistons disposed in the cylinder for being at least partially withdrawn from the cylinder to receive externally-applied liquid coolant during engine operation;

each piston including a crown and a skirt with external and internal surfaces; and a dispenser means on the cylinder for applying the liquid coolant to an external portion of the skirt of each piston as the piston is withdrawn from the cylinder.

48. The combination of claim 47, further including dispenser means on the cylinder for applying the coolant to the external surface of the cylinder.

49. The combination of claim 47, further including two ports for providing airflow through the cylinder, each piston disposed against a port and having a length such that the port is opened by the piston being substantially withdrawn from the cylinder.

50. The combination of claim 49, further including:

a saddle mounted to the top of each piston;

a plurality of connecting rods; and needle bearings coupling at least three connecting rods to each saddle.

51. A two-stroke, opposed piston, internal combustion engine, comprising:

a pair of side-mounted crankshafts;

at least one cylinder module disposed between the crankshafts;

a pair of opposed pistons in each cylinder module for being substantially withdrawn from the cylinder module during engine operation;

each piston including a crown and a skirt with external and internal surfaces;

each pair of pistons coupled to the crankshafts so as to exert no side force on a cylinder module during engine operation; and means for applying a liquid coolant to a portion of the external surface of the skirt of each piston that is substantially withdrawn from a cylinder module.

52. The engine of claim 51, wherein the pistons are ringless.

53. An internal combustion engine, comprising:

a cylinder with an internal bore;

first and second opposed pistons for reciprocating in the bore so as to be substantially withdrawn from the bore during at least a portion of an operating cycle of the internal combustion engine;

each piston including a skirt with external and internal surfaces; and a supply system means for providing a single liquid to cool the external surface of the skirt of each piston that protrudes from the bore, to lubricate the pistons, and to fuel the engine.

* * * * *